United States Patent
Jiang et al.

(10) Patent No.: US 12,470,436 B2
(45) Date of Patent: Nov. 11, 2025

(54) SYSTEM AND METHODS FOR AI-ASSISTED WIRELESS CHANNEL PREDICTION AND ESTIMATION

(71) Applicant: Aira Technologies, Inc., Saratoga, CA (US)

(72) Inventors: Yihan Jiang, Cupertino, CA (US); RaviKiran Gopalan, Saratoga, CA (US); Arman Rahimzamani, Saratoga, CA (US); Anand Chandrasekher, Saratoga, CA (US)

(73) Assignee: Aira Technologies, Inc., Saratoga, CA (US)

( * ) Notice: Subject to any disclaimer, the term of this patent is extended or adjusted under 35 U.S.C. 154(b) by 159 days.

(21) Appl. No.: 18/417,684

(22) Filed: Jan. 19, 2024

(65) Prior Publication Data

US 2024/0275642 A1    Aug. 15, 2024

Related U.S. Application Data

(60) Provisional application No. 63/461,816, filed on Apr. 25, 2023, provisional application No. 63/444,400, filed on Feb. 9, 2023.

(51) Int. Cl.
*H04L 25/02* (2006.01)
*G06F 18/28* (2023.01)
*H04W 28/02* (2009.01)

(52) U.S. Cl.
CPC .......... *H04L 25/0254* (2013.01); *G06F 18/28* (2023.01); *H04L 25/0204* (2013.01); *H04L 25/0236* (2013.01); *H04W 28/0242* (2013.01)

(58) Field of Classification Search
CPC ............. H04L 25/0254; H04L 25/0204; H04L 25/0236; H04L 25/0224; G06F 18/28; H04W 28/0242
USPC ........................................................ 709/238
See application file for complete search history.

(56) References Cited

U.S. PATENT DOCUMENTS

| | | |
|---|---|---|
| 11,244,723 B1 | 2/2022 | Karunaratne et al. |
| 2006/0013328 A1 | 1/2006 | Zhang et al. |
| 2013/0107746 A1 | 5/2013 | Wang et al. |
| 2018/0213513 A1 | 7/2018 | Sun et al. |
| 2019/0334683 A1 | 10/2019 | Lyu et al. |

(Continued)

FOREIGN PATENT DOCUMENTS

| | | |
|---|---|---|
| WO | 2022/271073 A1 | 12/2022 |
| WO | 2022/271564 A1 | 12/2022 |

(Continued)

OTHER PUBLICATIONS

Jongho Oh et al., "AI-Driven Modem Innovations for Shaping the Future RAN," Samsung Research, Communications, Apr. 28, 2025.

(Continued)

*Primary Examiner* — Adil Ocak
(74) *Attorney, Agent, or Firm* — Sheppard Mullin Richter & Hampton LLP; James Young Hurt

(57) ABSTRACT

This disclosure relates to methods, systems, and devices for AI/ML assisted wireless channel fingerprinting, estimation, and prediction. In one example embodiment, a method of combined AI/ML assisted wireless channel fingerprinting and channel prediction is disclosed. The method includes using a trained neural network to fingerprint the channel with the channel fingerprinting results advantageously being leveraged to improve the channel prediction.

20 Claims, 21 Drawing Sheets

(56) References Cited

U.S. PATENT DOCUMENTS

| | | |
|---|---|---|
| 2019/0356516 A1 | 11/2019 | Cao et al. |
| 2020/0275427 A1 | 8/2020 | Hooli et al. |
| 2021/0159993 A1 | 5/2021 | Studer et al. |
| 2021/0306039 A1 | 9/2021 | Vijayan et al. |
| 2023/0261712 A1 | 8/2023 | Balevi et al. |
| 2024/0275642 A1 | 8/2024 | Jiang et al. |

FOREIGN PATENT DOCUMENTS

| | | |
|---|---|---|
| WO | 2023/102045 A1 | 6/2023 |
| WO | 2024/233622 A1 | 11/2024 |

OTHER PUBLICATIONS

Daejung DJ Yoon et al., "From AI Concept to Real World: AI-Powered Modem for Next Samsung Cellular Networks," Samsung Research, Communications, May 26, 2025.

Yang Li et al., "Artificial Intelligence Augmentation for Channel State Information in 5G and 6G," AI-Powered Telco Network Automation: 5G Evolution and 6G, IEEE Wireless Communications, Feb. 2023, pp. 104-110.

Mehran Soltani et al., "Deep Learning-Based Channel Estimation," IEEE Communications Letters, vol. 23, No. 4, Apr. 2019, pp. 652-655.

Lianjun Li et al., "Deep Residual Learning Meets OFDM Channel Estimation," IEEE Wireless Communications Letters, vol. 9, No. 5, May 2020, pp. 615-618.

Min Jang et al., "Learning of Discrepancy to Validate Decoding Results with Error-Correcting Codes," 2024 IEEE International Conference on Communications (ICC): SAC Machine Learning for Communications and Networking Track, 2024, pp. 2931-2936.

"Algorithms to Antenna: 5G Channel Estimation Using Deep-Learning Techniques", Microwaves & RF, 7 pages, retrieved on Mar. 6, 2023, retrieved from URL: https://www.mwrf.com/technologies/embedded/systems/article/21167165/mathworks-algorithms-to-antenna-5g-channel-estimation-using-deep-learning-techniques.

"5G NR SRS (Sounding Reference Signals)", TELCOMA Global, 5 pages, retrieved on Feb. 9, 2023, retrieved from URL: https://telcomaglobal.com/p/5g-nr-srs-sounding-reference-signals.

"What is the benefit of using additional DMRS in 5G?", 5GWORLDPRO, 15 pages, retrieved on Feb. 9, 2023, retrieved from URL: https://www.5gworldpro.com/5g-knowledge/benefit-of-adding-dmrs-in-5g.html.

"5G Frame Structure: Learn to Navigate the 5G Frame and Channels—YouTube", YouTube, 9 pages, retrieved on Feb. 9, 2023, retrieved from URL: https://www.youtube.com/watch?v=nyzHklpWFjE.

ETSI Technical Report, 5G; Study on channel model for frequencies from 0.5 to 100 GHz, (3GPP TR 38.901 version 16.1.0 Release 16), ETSI TR 138 901 V16.1.0, Nov. 2020, 103 pages.

O-RAN Alliance, Test and Integration Focus Group, Criteria and Guidelines of Open Testing and Integration Centre, O-RAN.TIFG.CGofOTIC.0-v03.00 Process Document, Jul. 2020, 28 pages.

O-RAN Alliance, Test and Integration Focus Group, Certification and Badging Processes and Procedures, O-RAN. TIFG.Cert-Badge.0-v05.00, Technical Specification, Jul. 22, 26 pages.

O-RAN Alliance, O-RAN Test and Integration Focus Group, End-to-end Test Specification, O-RAN.TIFG.E2E-Test.0-v04.00, Technical Specification, Mar. 2021, 227 pages.

O-RAN Alliance, O-RAN Test and Integration Focus Group, End-to-End System Testing Framework Specification, O-RAN.TIFG.E2ETSTFWK.0-v01.00, Technical Specification, Jul. 2020, 69 pages.

O-RAN Alliance, O-RAN Information Model and Data Models Specification, O-RAN.WG1.Information Model and Data Models-v01.00, Technical Specification, Jul. 2022, 32 pages.

O-RAN Alliance, O-RAN Working Group 1Massive MIMO Use Cases, O-RAN.WG1.MMIMO-USE-CASES-TR-v01.00, Technical Report, Jul. 2022, 133 pages.

O-RAN Alliance, O-RAN Operations and Maintenance Interface Specification, O-RAN.WG1.O1-Interface.0-v04.00 Technical Specification, Nov. 2020, 67 pages.

O-RAN Alliance, O-RAN Operations and Maintenance Architecture, O-RAN.WG1.OAM-Architecture-v04.00 Technical Specification, Nov. 2020, 55 pages.

O-RAN Alliance, O-RAN Working Group 1, Slicing Architecture, O-RAN.WG1.Slicing-Architecture-v08.00 Technical Specification, 2022, 58 pages.

O-RAN Alliance, O-RAN Working Group 1, Study on O-RAN Slicing, O-RAN.WG1.Study-on-O-RAN-Slicing-v02.00 Technical Report, Mar. 2020, 29 pages.

O-RAN Alliance, O-RAN Working Group 1, Use Cases Analysis Report, O-RAN.WG1. Use-Cases-Analysis-Report-v09.00 Technical Report, Aug. 2022, 65 pages.

O-RAN Alliance, O-RAN Working Group 1, Use Cases Detailed Specification, O-RAN.WG1. Use-Cases-Detailed-Specification-v09.00 Technical Specification, Aug. 2022, 117 pages.

O-RAN Alliance, O-RAN Working Group 2 (Non-RT RIC and A1 interface WG), A1 interface: Application Protocol, O-RAN.WG2.A1AP-v03.02 Technical Specification, Apr. 2022, 57 pages.

O-RAN Alliance, O-RAN Working Group 2 (Non-RT RIC and A1 interface WG), A1 interface: General Aspects and Principles, O-RAN.WG2.A1GAP-v02.03 Technical Specification, Jul. 2021, 22 pages.

O-RAN Alliance, O-RAN Working Group 2 (Non-RT RIC and A1 interface WG), A1 interface: General Aspects and Principles, O-RAN.WG2.A1GAP-v03.00 Technical Specification, Jul. 2022, 21 pages.

O-RAN Alliance, O-RAN Working Group 2 (Non-RT RIC and A1 interface WG), A1 interface: Type Definitions, O-RAN.WG2.A1TD-v03.00 Technical Specification, Apr. 2022, 61 pages.

O-RAN Alliance, O-RAN Working Group 2 (Non-RT RIC and A1 interface WG), A1 interface: Transport Protocol, O-RAN.WG2.A1TP-v02.00 Technical Specification, Jul. 2022, 9 pages.

O-RAN Alliance, O-RAN Working Group 2 (Non-RT RIC and A1 interface WG), A1 interface: Test Specification, O-RAN.WG2.A1TS-v02.00 Technical Specification, Apr. 2022, 66 pages.

O-RAN Alliance, O-RAN Working Group 2 (Non-RT RIC and A1 interface WG), A1 interface: Use Cases and Requirements, O-RAN.WG2.A1UCR-v01.00 Technical Specification, Jul. 2022, 36 pages.

O-RAN Alliance, O-RAN Working Group 2, AI/ML workflow description and requirements, O-RAN.WG2.AIML-v01.03 Technical Report, Jul. 2021, 59 pages.

O-RAN Alliance, O-RAN Working Group 2, Non-RT RIC: Functional Architecture, O-RAN.WG2.Non-RT-RIC-ARCH-TR-v01.01 Technical Report, Mar. 2021, 52 pages.

O-RAN Alliance, O-RAN Working Group 2 (Non-RT RIC and A1 interface WG), Non-RT RIC Architecture, O-RAN. WG2.Non-RT-RIC-ARCH-TS-v02.01 Technical Report, Jul. 2022, 39 pages.

O-RAN Alliance, O-RAN Working Group 2 (Non-RT RIC and A1 interface WG), R1 interface: General Aspects and Principles, O-RAN.WG2.R1GAP-v03.00 Technical Specification, Jul. 2022, 20 pages.

O-RAN Alliance, O-RAN Working Group 2 (Non-RT RIC and A1 interface WG), Transport Protocols for R1 Services, O-RAN.WG2.R1TP-v02.00 Technical Specification, Jul. 2022, 7 pages.

O-RAN Alliance, O-Ran Working Group 2, Non-RT RIC & A1 Interface: Use Cases and Requirements, O-RAN. WG2.Use-Case-Requirements-v06.00 Technical Specification, Apr. 2021, 73 pages.

O-RAN Alliance, O-RAN Architecture Description, O-RAN.WG1.O-RAN-Architecture-Description-v07.00 Technical Specification, Oct. 2022, 38 pages.

O-RAN Alliance, O-RAN Working Group 2 (Non-RT RIC and A1 interface WG), A1 interface: Type Definitions, O-RAN.WG2.A1TD-v04.00 Technical Specification, Jul. 2022, 71 pages.

O-RAN Alliance, O-RAN Working Group 3, Near-Real-time RAN Intelligent Controller, E2 Application Protocol (E2AP), O-RAN.WG3.E2AP-v02.03 Technical Specification, Jul. 2022, 96 pages.

O-RAN Alliance, O-RAN Working Group 3Near-Real-time RAN Intelligent Controller, Architecture & E2 General Aspects and Principles, O-RAN.WG3.E2GAP-v02.02 Technical Specification, Jun. 2022, 38 pages.

O-RAN Alliance, O-RAN Working Group 3, Near-Real-time RAN Intelligent Controller E2 Service Model (E2SM), O-RAN.WG3.E2SM-v02.01 Technical Specification, Feb. 2022, 38 pages.

(56) References Cited

OTHER PUBLICATIONS

O-RAN Alliance, O-RAN Working Group 3 E2 Interface Test Specification, O-RAN.WG3.E2TS.v01.00 Technical Specification, Jun. 2022, 73 pages.
O-RAN Alliance, O-RAN Working Group 3 Near-Real-time RAN Intelligent Controller, E2 Service Model (E2SM), RAN Function Network Interface (NI), ORAN-WG3.E2SM-NI-v01.00.00 Technical Specification, Jan. 2020, 45 pages.
O-RAN Alliance, O-RAN Working Group 4 (Fronthaul Working Group), Conformance Test Specification, O-RAN. WG4.CONF.0-v06.00 Technical Specification, Jul. 2022, 363 pages.
O-RAN Alliance, O-RAN Working Group 4 (Open Fronthaul Interfaces), Cooperative Transport Interface Transport Control Plane Specification, O-RAN.WG4.CTI-TCP.0-v03.00 Technical Specification, Jul. 2022, 47 pages.
O-RAN Alliance, O-RAN Working Group 4 (Open Fronthaul Interfaces), Cooperative Transport Interface Transport Management Procedures Specification, O-RAN.WG4.CTI-TMP.0-v03.00 Technical Specification, Jul. 2022, 54 pages.
O-RAN Alliance, O-RAN Working Group 4 (Open Fronthaul Interfaces WG), Control, User and Synchronization Plane Specification, O-RAN.WG4.CUS.0-v07.02 Technical Specification, Apr. 2022, 319 pages.
O-RAN Alliance, O-RAN Working Group 4 (Open Fronthaul Interfaces WG), Control, User and Synchronization Plane Specification, O-RAN.WG4.CUS.0-v08.01 Technical Specification, Mar. 2022, 336 pages.
O-RAN Alliance, O-RAN Working Group 4 (Open Fronthaul Interfaces WG), Control, User and Synchronization Plane Specification, O-RAN.WG4.CUS.0-v09.00 Technical Specification, Apr. 2022, 335 pages.
O-RAN Alliance, O-RAN Working Group 4 (Open Fronthaul Interfaces WG), Control, User and Synchronization Plane Specification, O-RAN.WG4.CUS.0-v10.00 Technical Specification, Jul. 2022, 358 pages.
O-RAN Alliance, O-RAN Fronthaul Working Group, Fronthaul Interoperability Test Specification (IOT), O-RAN. WG4.IOT.0-v08.00 Technical Specification, Aug. 2022, 125 pages.
O-RAN Alliance, O-RAN Alliance Working Group 4, Management Plane Specification, O-RAN.WG4.MP.0-v07.01 Technical Specification, Oct. 2021, 219 pages.
O-RAN Alliance, O-RAN Working Group 4 (Open Fronthaul Interfaces WG), Management Plane Specification, O-RAN.WG4.MP.0-v10.00 Technical Specification, Aug. 2022, 260 pages.
O-RAN Alliance, O-RAN Open F1/W1/E1/X2/Xn Interfaces Working Group, NR C-plane profile, O-RAN.WG5.C.1- v07.00, Technical Specification, Mar. 2022, 163 pages.
O-RAN Alliance, O-RAN Open F1/W1/E1/X2/Xn Interfaces Working Group, NR C-plane profile, O-RAN.WG5.C.1-v08.00, Technical Specification, Jul. 2022, 173 pages.
O-RAN Alliance, O-RAN Open F1/W1/E1/X2/Xn Interfaces Working Group, Interoperability Test Specification (IOT), O-RAN.WG5.IOT.0-v05.00, Jul. 2022, 166 pages.
O-RAN Alliance, O-RAN Alliance Working Group 5, 01 Interface specification for O-CU-UP and O-CU-CP, O-RAN-WG5.O-CU-O1.0-v04.00, Technical Specification, Jul. 2022, 60 pages.
O-RAN Alliance, O-RAN Alliance Working Group 5, 01 Interface specification for O-DU, O-RAN.WG5.O-DU-O1.0-v05.00, Technical Specification, Jul. 2022, 132 pages.
O-RAN Alliance, O-RAN Open F1/W1/E1/X2/Xn Interfaces Working Group, Transport Specification, O-RAN.WG5. Transport.0-v01.00, Technical Specification, Mar. 2020, 19 pages.
O-RAN Alliance, O-RAN Open F1/W1/E1/X2/Xn Interfaces Working Group, NR U-plane profile, O-RAN.WG5.U.0-v05.00, Technical Specification, Nov. 2021, 10 pages.
O-RAN Alliance, O-RAN Working Group 6, (Cloudification and Orchestration Workgroup), Acceleration Abstraction Layer, Common API, O-RAN.WG6.AAL Common API.0-v02.00, Technical Specification, Aug. 2022, 50 pages.
O-RAN Alliance, O-RAN Working Group 6, (Cloudification and Orchestration Workgroup), Acceleration Abstraction Layer High-PHY Profiles, O-RAN.WG6.AAL-HI_PHY.0-v03.00, Technical Specification, Jul. 2022, 57 pages.
O-RAN Alliance, O-RAN Working Group 6, (Cloudification and Orchestration Work Group), Acceleration Abstraction Layer, FEC Profiles, ORAN-WG6.AAL-FEC.0-v03.00, Technical Specification, Jun. 2022, 18 pages.
O-RAN Alliance, O-RAN Working Group 6, (Cloudification and Orchestration Work Group), O-RAN Acceleration Abstraction Layer, General Aspects and Principles, O-RAN.WG6.AAL-GAnP.0-v04.00, Technical Specification, 2022, 55 pages.
O-RAN Alliance, O-RAN Working Group 6, Acceleration Abstraction Layer, AAL Profile—MUMIMO Precoder/BeamFormer Calculation, O-RAN.WG6.AAL MUMIMO BF Calc Profile v01.00, Technical Specification, Feb. 2022, 12 pages.
O-RAN Alliance, O-Ran Working Group 6 (Cloudification and Orchestration), Cloud Architecture and Deployment Scenarios for O-RAN Virtualized RAN, O-RAN.WG6.CADS-v04.00, Technical Report, Jul. 2022, 55 pages.
O-RAN Alliance, Cloud Platform Reference Designs, O-RAN.WG6.CLOUD-REF-v02.00, Technical Specification, Nov. 2020, 43 pages.
O-RAN Alliance, O-RAN Working Group 6, O2dms Interface Specification: Profile based on ETSI NFV Protocol and Data Models, O-RAN.WG6.O2DMS-INTERFACE-ETSI-NFV-PROFILE-v02.00, Technical Specification, 2022, 67 pages.
O-RAN Alliance, O-RAN Working Group 6, O2dms Interface Specification: Kubernetes Native API Profile for Containerized NFs, O-RAN.WG6.O2DMS-INTERFACE-K8S-PROFILE-v02.00, Technical Specification, 2022, 28 pages.
O-RAN Alliance, O-RAN 02 InterfaceGeneral Aspects and Principles, O-RAN.WG6.02-GA&P-v01.02, Technical Specification, Nov. 2021, 42 pages.
O-RAN Alliance, O-RAN Working Group 6, 02 Interface General Aspects and Principles, O-RAN.WG6.02-GA&P-v02.00, Technical Specification, 2022, 37 pages.
O-RAN Alliance, O-RAN Working Group 6, O2ims Interface Specification, O-RAN.WG6.02IMS-INTERFACE-v03.00 Technical Specification, 2022, 80 pages.
O-RAN Alliance, O-RAN Working Group 6, O-Cloud Notification API Specification for Event Consumers, O-RAN. WG6.O-Cloud Notification API-v03.00, Technical Specification, 2022, 33 pages.
O-RAN Alliance, O-RAN Working Group 6, Cloudification and Orchestration Use Cases and Requirements for O- Ran Virtualized RAN, O-RAN-WG6.ORCH-USE-CASES-v05.00, Technical Specification, 2022, 139 pages.
O-RAN Alliance, O-RAN White Box Hardware Working Group Deployment Scenarios and Base Station Classes, ORAN.WG7.DSC.0-v04.00, Technical Specification, Jul. 2022, 27 pages.
O-RAN Alliance, O-RAN White Box Hardware Working Group Hardware Reference Design Specification for Fronthaul Gateway, O-RAN.WG7.FHGW-HRD.0-v02.00, Technical Specification, Jul. 2021, 36 pages.
O-RAN Alliance, O-RAN White Box Hardware Working Group, Indoor Picocell Hardware Architecture and Requirement (FR1 Only) Specification, O-RAN.WG7.IPC-HAR.0-v01.00, Technical Specification, Feb. 2020, 49 pages.
O-RAN Alliance, O-RAN White Box Hardware Working Group, Hardware Reference Design Specification for Indoor Pico Cell with Fronthaul Split Option 6, O-RAN.WG7.IPC-HRD-Opt6.0-v02.00, Technical Specification, Jul. 2021, 41 pages.
O-RAN Alliance, O-RAN WG7 Hardware Reference Design Specification for Indoor Picocell (FR1) with Split Architecture Option 7-2, ORAN.WG7.IPC-HRD-Opt7-2.0-v03.00, Technical Specification, Jul. 2021, 121 pages.
O-RAN Alliance, O-RAN WG7 Hardware Reference Design Specification for Indoor Picocell (FR1) with Split Architecture Option 8, ORAN.WG7.IPC-HRD-Opt8.0-v03.00, Technical Specification, Jul. 2021, 184 pages.
O-RAN Alliance, O-RAN White Box Hardware Working Group, Outdoor Macrocell Hardware Architecture and Requirements (FR1) Specification, O-RAN.WG7.OMAC-HAR.0-v03.00, Technical Specification, Jul. 2022, 35 pages.

(56) References Cited

OTHER PUBLICATIONS

O-RAN Alliance, O-RAN White Box Hardware Working Group 7, Hardware Reference Design Specification for Outdoor Macro Cell with Split Architecture Option 7.2, ORAN-WG7.OMAC.HRD-v01.00, Technical Specification, Feb. 2022, 76 pages.

O-RAN Alliance, O-RAN White Box Hardware Working Group, Outdoor Micro Cell Hardware Architecture and Requirements (FR1) Specification, O-RAN.WG7.OMC-HAR.0-v01.00, Technical Specification, Jan. 2021, 39 pages.

O-RAN Alliance, O-RAN White Box Hardware Working Group, Hardware Reference Design Specification for Outdoor Micro Cell with Split Architecture Option 7.2, ORAN.WG7.OMC-HRD.07-2-v03.00, Technical Specification, Jun. 2022, 75 pages.

O-RAN Alliance, O-RAN Working Group 8, Base Station O-DU and O-CU Software Architecture and APIs, O-RAN. WG8.AAD.0-v07.00, Technical Specification, 2021, 141 pages.

O-RAN Alliance, O-RAN Working Group 8 (Stack Reference Design), Stack Interoperability Test Specification, ORAN-WG8.IOT.0-v05.00, Technical Specification, Jul. 2022, 192 pages.

O-RAN Alliance, O-RAN Open Xhaul Transport WG9, WDM-based Fronthaul Transport, ORAN-WG9.WDM.0-v02.00, Technical Specification, Nov. 2021, 61 pages.

O-RAN Alliance, O-RAN Open Transport Working Group 9, Xhaul Packet Switched Architectures and Solutions, ORAN-WG9.XPAAS.0-v03.00, Technical Specification, Feb. 2022, 193 pages.

O-RAN Alliance, O-RAN Open X-haul Transport Working Group, Management interfaces for Transport Network Elements, O-RAN.WG9.XTRP-MGT.0-v04.00, Technical Specification, Mar. 2022, 52 pages.

O-RAN Alliance, O-RAN Open Xhaul Transport Working Group 9, Xhaul Transport Requirements, O-RAN.WG9.XTRP-REQ-v01.00, Technical Specification, Nov. 2020, 73 pages.

O-RAN Alliance, O-RAN Open Xhaul Transport Working Group 9, Synchronization Architecture and Solution Specification, O-RAN.WG9.XTRP-SYN-v03.00, Technical Specification, Jul. 2022, 115 pages.

O-RAN Alliance, O-RAN Open Xhaul Transport Working Group 9, Xhaul Transport Testing, O-RAN.WG9.XTRP-TST-v02.00, Technical Specification, Jul. 2022, 242 pages.

O-RAN Alliance, O-RAN Information Model and Data Models Specification, O-RAN.WG10.Information Model and Data Models.0-v03.00, Technical Specification, 2022, 39 pages.

O-RAN Alliance, O-RAN Operations and Maintenance Interface Specification, O-RAN.WG10.01-Interface.0-v08.00, Technical Specification, Jul. 2022, 75 pages.

O-RAN Alliance, O-RAN Operations and Maintenance Architecture, O-RAN.WG10.OAM-Architecture-v07.00, Technical Specification, Mar. 2022, 67 pages.

O-RAN Alliance, O-RAN Security Focus Group (SFG), Study on Security for Non-RT-RIC, O-RAN.SFG.Non-RT-RIC-Security-TR-v01.00, Technical Report, Mar. 2022, 35 pages.

O-RAN Alliance, O-RAN Security Focus Group (SFG), Study on Security for O-Cloud, O-RAN.SFG.O-Cloud-Security-TR-v01.00, Technical Report, Mar. 2022, 72 pages.

O-RAN Alliance, O-RAN Security Focus Group, Study on Security for Near Real Time RIC and xApps, O-RAN.SFG. Security-for-Near-RT-RIC-xApps-v01.00, Technical Report, 2022, 48 pages.

O-RAN Alliance, O-RAN Working Group 11 (Security Working Group), Security Protocols Specifications, O-RAN. WG11.Security-Protocols-Specifications-v04.00, Technical Specification, Jul. 2022, 22 pages.

O-RAN Alliance, O-RAN Working Group 11 (Security Working Group), Security Requirements Specifications, O-RAN.WG11.Security-Requirements-Specifications-v04.00, Technical Specification, Jul. 2022, 53 pages.

O-RAN Alliance, O-RAN Working Group 11 (Security Work Group), O-RAN Security Test Specifications, O-RAN. WG11.Security-Test-Specifications-v03.00, Technical Specification, Jul. 2022, 53 pages.

O-RAN Alliance, O-RAN-Working Group 11 (Security Working Group), O-RAN Security Threat Modeling and Remediation Analysis, O-RAN.WG11. Threat-Model-v04.00, Technical Specification, Jul. 2022, 101 pages.

International Search Report and Written Opinion for Application No. PCT/US2024/012171, mailed on Apr. 19, 2024, 20 pages.

International Search Report and Written Opinion for Application No. PCT/US2025/013422, mailed on Apr. 4, 2025, 10 pages.

Attiah et al., "Deep Learning for Channel Sensing and Hybrid Precoding in TDD Massive MIMO OFDM Systems", In: arvix, Jun. 29, 2022, online, retrieved on Mar. 25, 2025, from URL [https://arvix.org/abs/2011.10709].

Peken, Ture. "Machine Learning for Channel Estimation and Hybrid Beamforming in Millimeter-Wave Wireless Networks", In: Doctoral Dissertation, University of Arizona, Tucson, USA, 2021, online, retrieved on Mar. 25, 2025, from URL [https://repository.arizona.edu/handle/10150/657770].

Lv et al., "Deep Learning for Channel Estimation in Physical Layer Wireless Communications: Fundamental, Methods, and Challenges", In: Electronics 2023, 12, 4965, retrieved on Mar. 25, 2025, from URL [https://www.mdpi.com/2079-9292/12/24/4965].

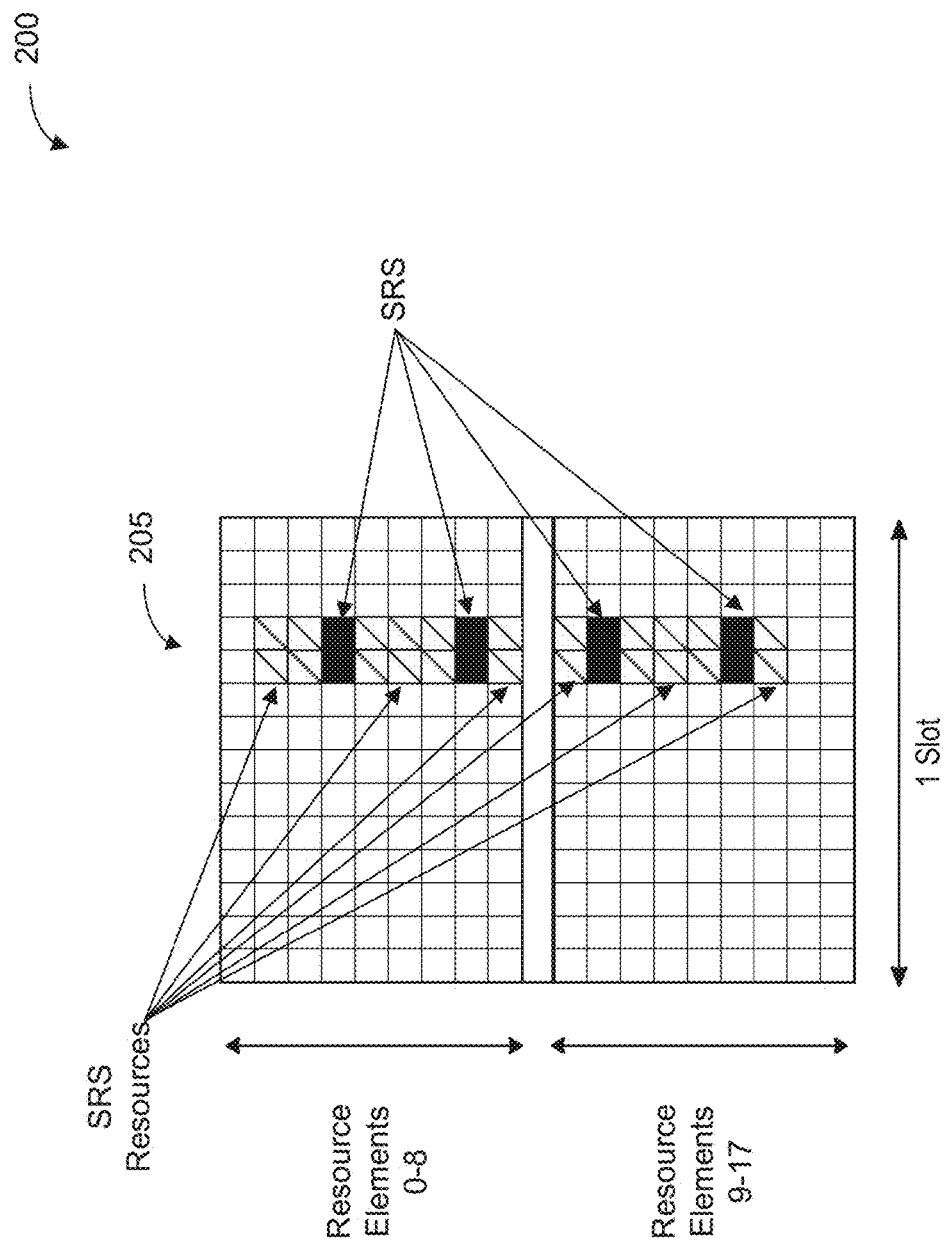

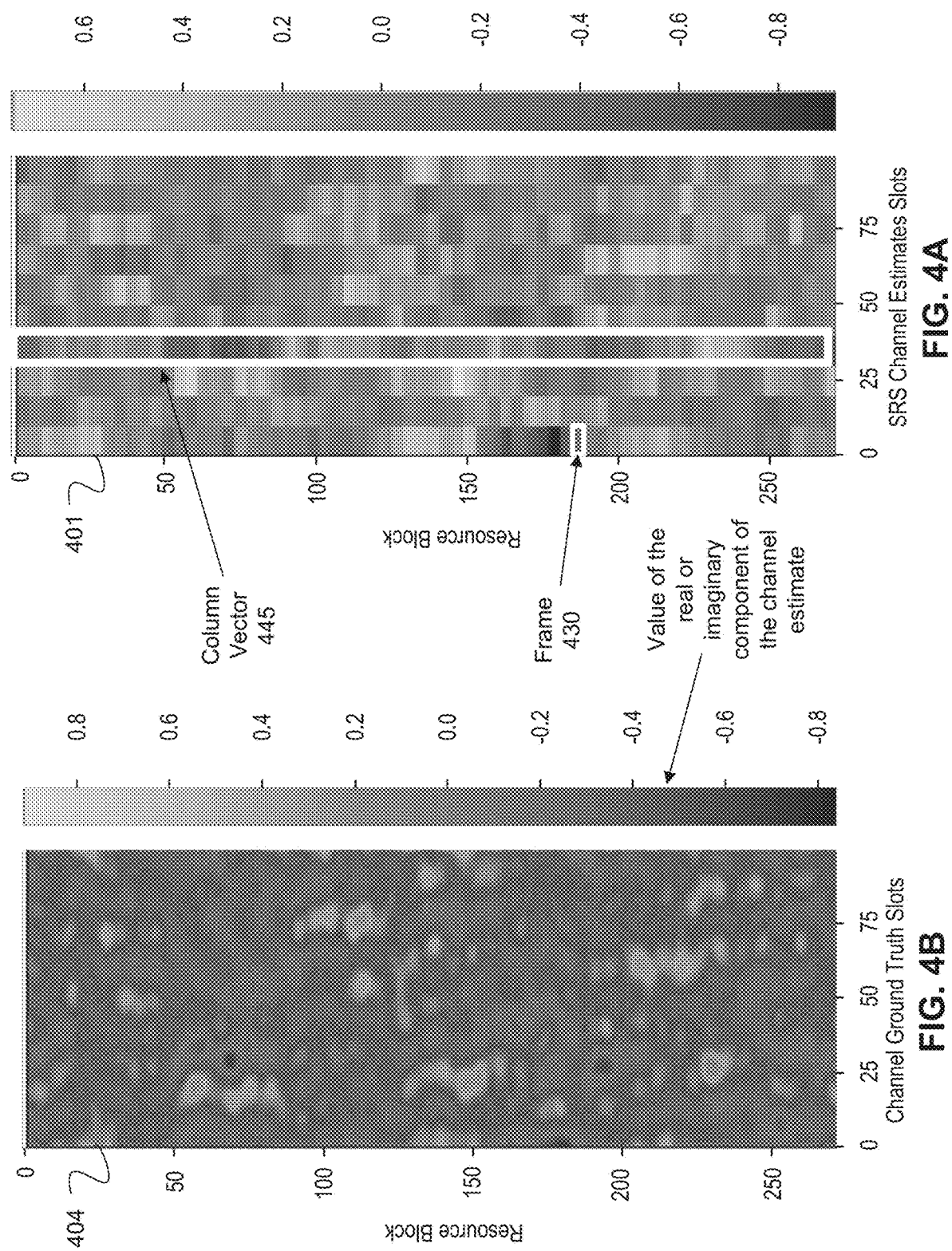

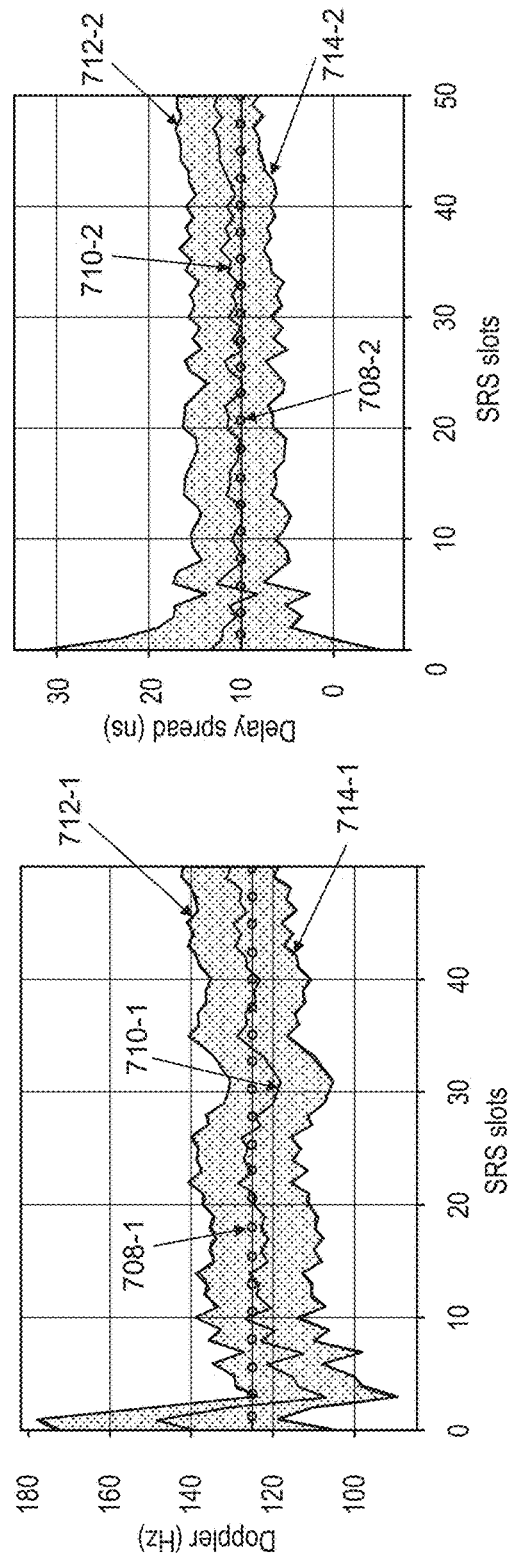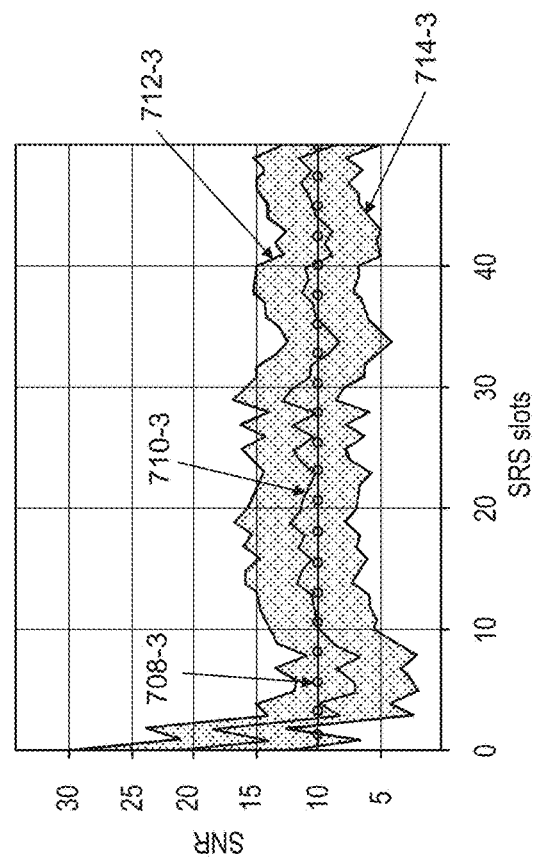
FIG. 7A
FIG. 7B
FIG. 7C

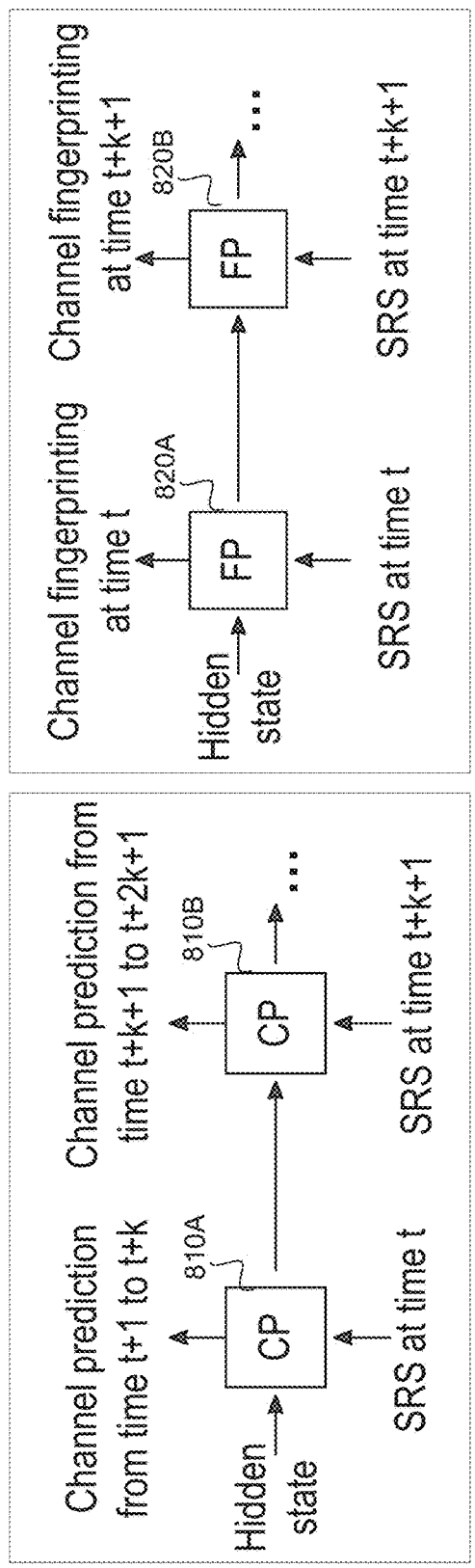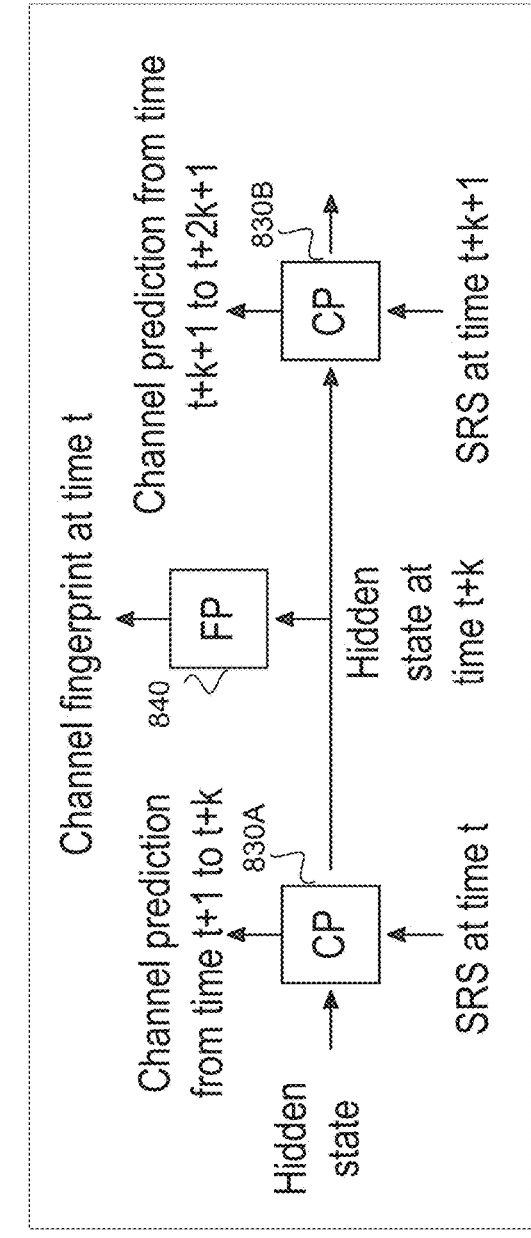
FIG 8A
FIG 8B
FIG 8C

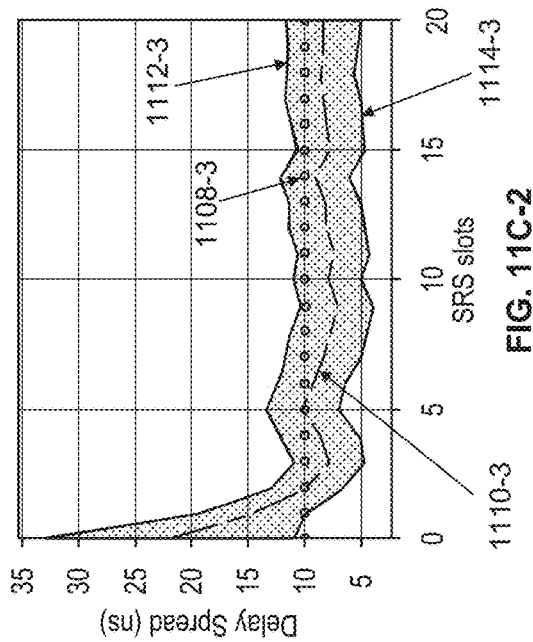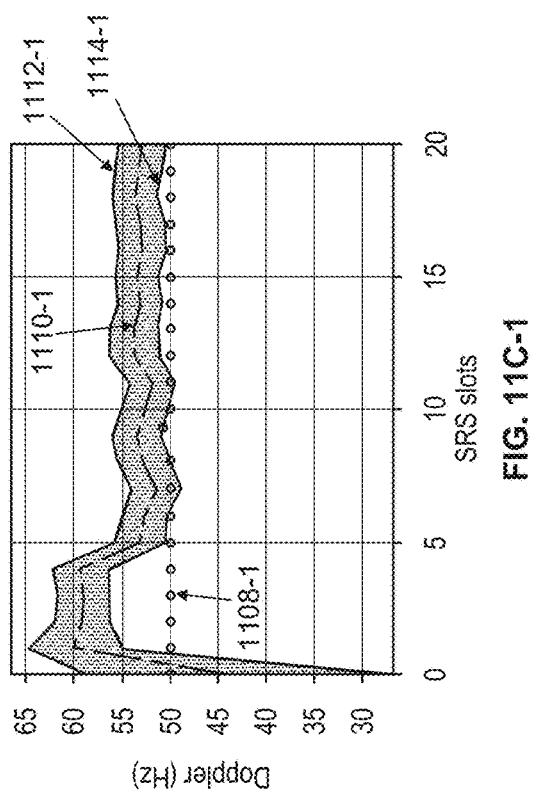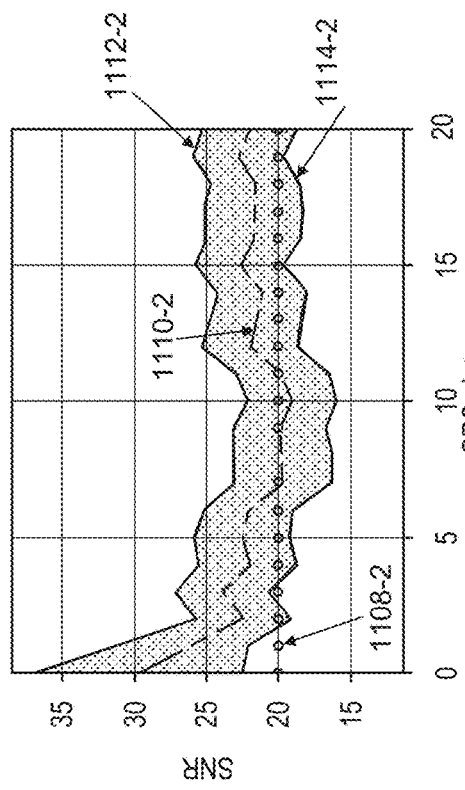
FIG. 11C

SYSTEM AND METHODS FOR AI-ASSISTED WIRELESS CHANNEL PREDICTION AND ESTIMATION

CROSS REFERENCE TO RELATED APPLICATIONS

The present application claims priority to U.S. Provisional Patent Application No. 63/461,816, filed Apr. 25, 2023, entitled "SYSTEM AND METHODS FOR AI-ASSISTED WIRELESS CHANNEL PREDICTION & ESTIMATION" and U.S. Provisional Patent Application No. 63/444,400, filed Feb. 9, 2023, entitled "SYSTEM AND METHODS FOR AI-ASSISTED WIRELESS CHANNEL PREDICTION & ESTIMATION," the disclosures thereof incorporated by reference herein in their entirety.

BACKGROUND

Accurate channel estimation is essential for modern radio communication systems, especially in highly dynamic and time-varying environments. Multiple communication functions (beamforming, scheduling, resource allocation, etc.) are highly dependent on accurate channel estimation. In wireless communication systems, the channel between the transmitter and receiver is often characterized by a time-varying, multipath channel. Multipath channel characteristics can vary rapidly due to factors such as mobility and environmental changes.

A channel estimation technique that can accurately estimate and predict the channel response, parameters, and obtain reliable information about the channel's characteristics would greatly improve the performance of the wireless network. Improving channel estimation can benefit all downstream tasks, and eventually improve key performance indicators (KPIs) for customers. In addition, accurate channel estimation information can be used to improve various communications functions such as beamforming, scheduling, and resource allocation. Improving these functions can lead to better quality of service (QOS), higher throughput, and lower packet loss rates. Accurate channel prediction can also improve the QoS and overall performance (e.g., throughput, delay, etc.) of the wireless system by providing information about future channel conditions.

SUMMARY

In accordance with one or more embodiments, various features and functionality are provided to enable AI/ML assisted wireless channel fingerprinting and wireless channel estimation and prediction by leveraging a trained neural network capable of tracking and predicting the underlying channel variations despite the limited sampling.

Other features and aspects of the disclosed technology will become apparent from the following detailed description, taken in conjunction with the accompanying drawings, which illustrate by way of example, the features in accordance with embodiments of the disclosed technology. The summary is not intended to limit the scope of any inventions described herein, which are solely defined by the claims attached hereto.

In general, one aspect disclosed features a system comprising: one or more hardware processors; and one or more non-transitory machine-readable storage media encoded with instructions that, when executed by the one or more hardware processors, cause the system to perform operations comprising: receiving an uplink signal from a user equipment (UE), the uplink signal comprising an sounding reference signal (SRS) slot followed by multiple non-SRS slots; obtaining an SRS by demodulating the SRS slot; formatting the SRS into a column vector; and generating a predicted channel estimate for the non-SRS slots by applying the column vector as input to a trained artificial intelligence (AI) model, wherein responsive to the input, the AI model outputs the predicted channel estimate, wherein the trained AI model has been trained with a training data set, and wherein the training data set includes historical low-resolution two dimensional image representations (TDIR) of channel estimates over time and frequency.

Embodiments of the system may include one or more of the following features. In some embodiments, the operations further comprise: demodulating the non-SRS slots according to the predicted channel estimate. In some embodiments, generating a predicted channel estimate for the non-SRS slots further comprises: applying a hidden state to the trained AI model, the hidden state generated by the trained AI model based on a prior SRS. In some embodiments, generating a predicted channel estimate for the non-SRS slots further comprises: receiving a fingerprint of a channel of the uplink signal, the fingerprint generated prior to the SRS slot; and generating the predicted channel estimate for the non-SRS slots based on the fingerprint.

In some embodiments, the operations further comprise: generating the fingerprint by: reducing a dimensionality of the prior SRS by applying the prior SRS as input to one or more convolutional neural networks (CNNs), applying the hidden state and an output of the one or more CNNs as input to a recurrent artificial intelligence (AI) model, and applying an output of the recurrent AI model to a multilayer perception (MLP) layer, wherein responsive to the output of the recurrent AI model, the MLP layer generates the fingerprint.

In some embodiments, the operations further comprise: validating the AI model by applying a testing data set as input to the AI model, wherein the testing data set is different from the training data set, and determining an error rate by comparing a resulting output of the AI model with known genie values. In some embodiments, the operations further comprise: retraining the AI model using additional training data sets responsive to the error rate exceeding a threshold value.

In general, one aspect disclosed features one or more non-transitory machine-readable storage media encoded with instructions that, when executed by one or more hardware processors of a computing system, cause the computing system to perform operations comprising: receiving an uplink signal from a user equipment (UE), the uplink signal comprising an sounding reference signal (SRS) slot followed by multiple non-SRS slots; obtaining an SRS by demodulating the SRS slot; formatting the SRS into a column vector; and generating a predicted channel estimate for the non-SRS slots by applying the column vector as input to a trained artificial intelligence (AI) model, wherein responsive to the input, the AI model outputs the predicted channel estimate, wherein the trained AI model has been trained with a training data set, and wherein the training data set includes historical low-resolution two dimensional image representations (TDIR) of channel estimates over time and frequency.

Embodiments of the one or more non-transitory machine-readable storage media may include one or more of the following features. In some embodiments, the operations further comprise: demodulating the non-SRS slots according to the predicted channel estimate. In some embodiments, generating a predicted channel estimate for the non-SRS slots further comprises: applying a hidden state to the trained AI model, the hidden state generated by the trained AI model based on a prior SRS. In some embodiments, generating a predicted channel estimate for the non-SRS slots further comprises: receiving a fingerprint of a channel of the uplink signal, the fingerprint generated prior to the SRS slot; and generating the predicted channel estimate for the non-SRS slots based on the fingerprint.

In some embodiments, the operations further comprise: generating the fingerprint by: reducing a dimensionality of the prior SRS by applying the prior SRS as input to one or more convolutional neural networks (CNNs), applying the hidden state and an output of the one or more CNNs as input to a recurrent artificial intelligence (AI) model, and applying an output of the recurrent AI model to a multilayer perception (MLP) layer, wherein responsive to the output of the recurrent AI model, the MLP layer generates the fingerprint. In some embodiments, the operations further comprise: validating the AI model by applying a testing data set as input to the AI model, wherein the testing data set is different from the training data set, and determining an error rate by comparing a resulting output of the AI model with known genie values. In some embodiments, the operations further comprise: retraining the AI model using additional training data sets responsive to the error rate exceeding a threshold value.

In general, one aspect disclosed features a computer-implemented method comprising: receiving an uplink signal from a user equipment (UE), the uplink signal comprising an sounding reference signal (SRS) slot followed by multiple non-SRS slots; obtaining an SRS by demodulating the SRS slot; formatting the SRS into a column vector; and generating a predicted channel estimate for the non-SRS slots by applying the column vector as input to a trained artificial intelligence (AI) model, wherein responsive to the input, the AI model outputs the predicted channel estimate, wherein the trained AI model has been trained with a training data set, and wherein the training data set includes historical low-resolution two dimensional image representations (TDIR) of channel estimates over time and frequency.

Embodiments of the computer-implemented method may include one or more of the following features. Some embodiments comprise demodulating the non-SRS slots according to the predicted channel estimate. In some embodiments, generating a predicted channel estimate for the non-SRS slots further comprises: applying a hidden state to the trained AI model, the hidden state generated by the trained AI model based on a prior SRS. In some embodiments, generating a predicted channel estimate for the non-SRS slots further comprises: receiving a fingerprint of a channel of the uplink signal, the fingerprint generated prior to the SRS slot; and generating the predicted channel estimate for the non-SRS slots based on the fingerprint.

Some embodiments comprise generating the fingerprint by: reducing a dimensionality of the prior SRS by applying the prior SRS as input to one or more convolutional neural networks (CNNs), applying the hidden state and an output of the one or more CNNs as input to a recurrent artificial intelligence (AI) model, and applying an output of the recurrent AI model to a multilayer perception (MLP) layer, wherein responsive to the output of the recurrent AI model, the MLP layer generates the fingerprint. Some embodiments comprise validating the AI model by applying a testing data set as input to the AI model, wherein the testing data set is different from the training data set, and determining an error rate by comparing a resulting output of the AI model with known genie values; and retraining the AI model using additional training data sets responsive to the error rate exceeding a threshold value.

BRIEF DESCRIPTION OF THE DRAWINGS

The technology disclosed herein, in accordance with one or more various embodiments, is described in detail with reference to the following figures (hereafter referred to as "FIGS."). The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 4A is an illustration of an example low resolution two dimensional image representation (TDIR) of channel estimates over time and frequency, according to one embodiment.

FIG. 4B is an illustration of an example high resolution TDIR of channel estimates over time and frequency, according to one embodiment.

FIGS. 7A-7C are illustrations of example structures of AI models for channel prediction and fingerprinting, according to one embodiment.

FIGS. 8A-8C are illustrations of example channel fingerprinting results, according to one embodiment.

FIGS. 11A-1-11C-3 are illustrations of example channel prediction and fingerprinting results, according to one embodiment.

DETAILED DESCRIPTION

Figure 1A:
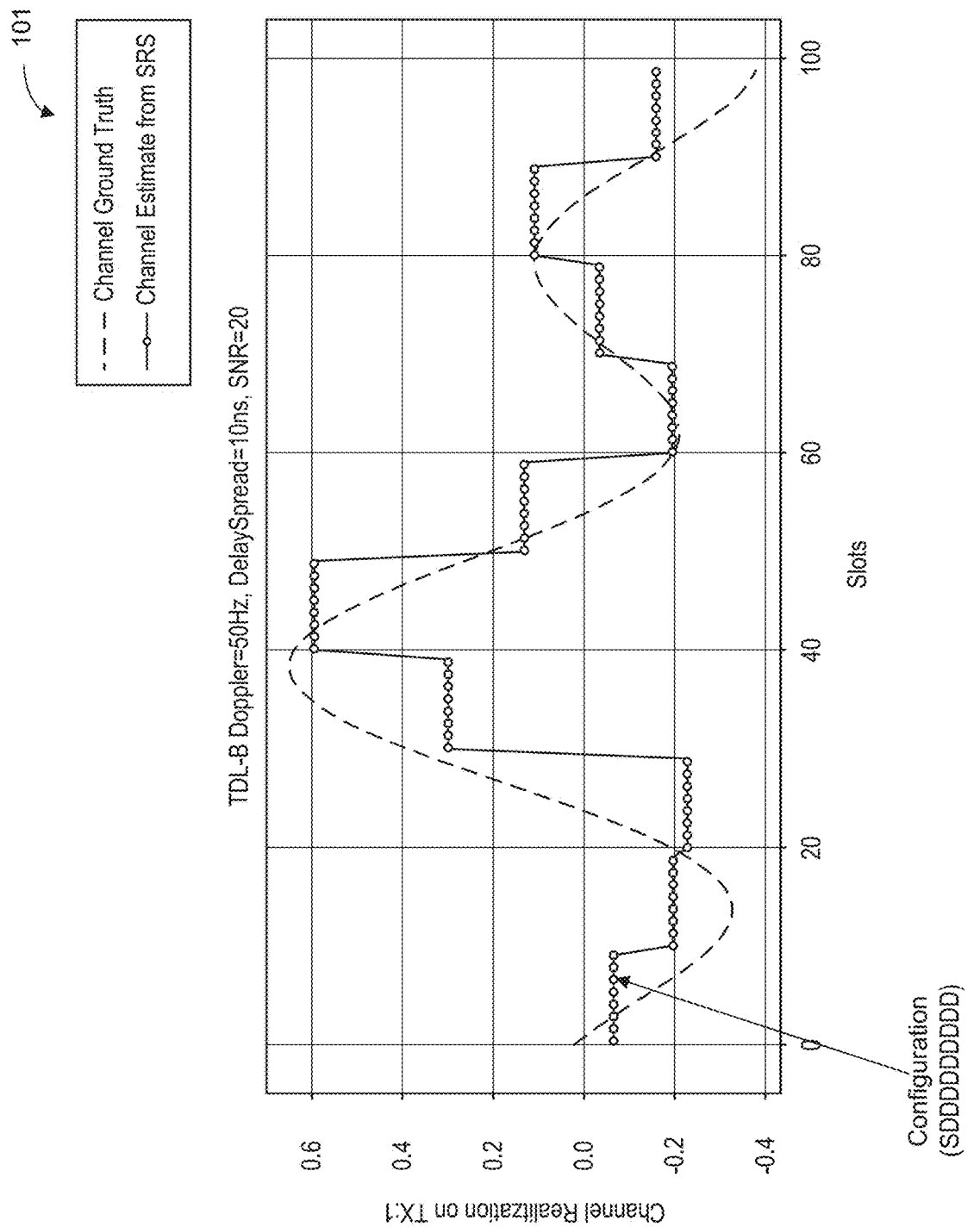
FIG. 1A is an example illustration of channel aging, according to one embodiment.

Pilot-aided channel estimation (as opposed to blind estimation) is typically performed by transmitting a known signal from the transmitter to the receiver. Examples of known signals used for channel estimation include but are not limited to pilot signals, training sequences, reference signals, and sounding reference signals (SRS). In reciprocal channels (i.e., the channel response is expected to be identical in both the uplink and downlink direction, not taking into account the radio effects, which can be calibrated out), it is possible to estimate the channel in the uplink direction at the base station and use the estimate in the downlink direction (or vice-versa). The SRS is transmitted in a special slot [S] that is scheduled by the base station. The UE sends the SRS signals to the base station in the [S] slot using a predetermined set of parameters (e.g., the frequency and time-domain location of the signal). The base station is configured to receive the SRS signal and use it to estimate the channel characteristics (e.g., channel frequency response, channel delay spread, and doppler).

The multipath fading channel between the transmitter and receiver (a communication channel exists between each transmit/receive antenna pair) is often modeled as a linear time-varying system with an equivalent baseband representation of the form, as is well known in the art:

$$y(t) = \sum_i a_i(t)x(t - \tau_i(t)) + z(t)$$

Where y(t) is the received signal, x(t) is the transmitted signal, z(t) is additive white gaussian noise, i is the number of resolvable paths from the transmitter to the receiver, $a_i(t)$ is the overall attenuation of path i, and $\tau_i(t)$ is the propagation delay from the transmitter to the receiver of path i. The equivalent baseband model determines the channel's behavior and characteristics across frequency and time. The channel characteristics typically include at least one of: (i) delay spread; (ii) coherence bandwidth (inversely proportional to delay spread); (iii) doppler; (iv) coherence time (inversely proportional to doppler) and (v) channel model (e.g., pedestrian, indoor, vehicular, etc.). The communication channel also typically includes dynamic user characteristics that also affect the channel's behavior. The user characteristics typically include at least one of: (i) path loss (determined by the distance from a next generation node B (gNB)); (ii) user mobility; and (iii) other radio frequency (RF) impairments.

Current channel estimation methods implemented in 5G systems fail to use side information that could be extracted from RF and user characteristics. For example, conventional channel estimation schemes often fail to use delay spread and doppler information. Unlike the current methods, the disclosed artificial intelligence (AI) assisted wireless channel prediction and estimation system (hereafter referred to as the "system") can use information between adjacent frames and prior frames in a two-dimensional image representation (TDIR) to improve channel estimation and prediction. The system can accurately predict the complex channel response (consisting of a real and imaginary component) when no reference signal is present for each subcarrier and slot. For example, given a SRS sent only once every 10 slots (e.g., a periodicity of one SRS signal every 10 milliseconds), the system can accurately predict the channel estimate for non-SRS slots.

In one embodiment, the system includes an AI model trained to generate a channel estimate and prediction given a low-resolution column vector as an input. For example, upon receiving a column vector comprising sub-sampled channel estimates in both the time and frequency domain across each resource block (RB), the AI model can be trained to accurately generate a channel estimate and prediction for each sub-sampled slot. By training the AI model using the various machine learning (ML) methods disclosed herein, the AI model can be trained to accurately generate a channel estimate and prediction for non-SRS slots previously unseen to the AI model. For example, upon receiving as an input a column vector representing the demodulated reference signal transmitted in slot 100, in which each row of the column vector represents the demodulated sounding referencing signal for each resource block, the system can use algorithms, from which it was previously trained, to accurately predict the channel estimate for slots 101-109.

Figure 1B:
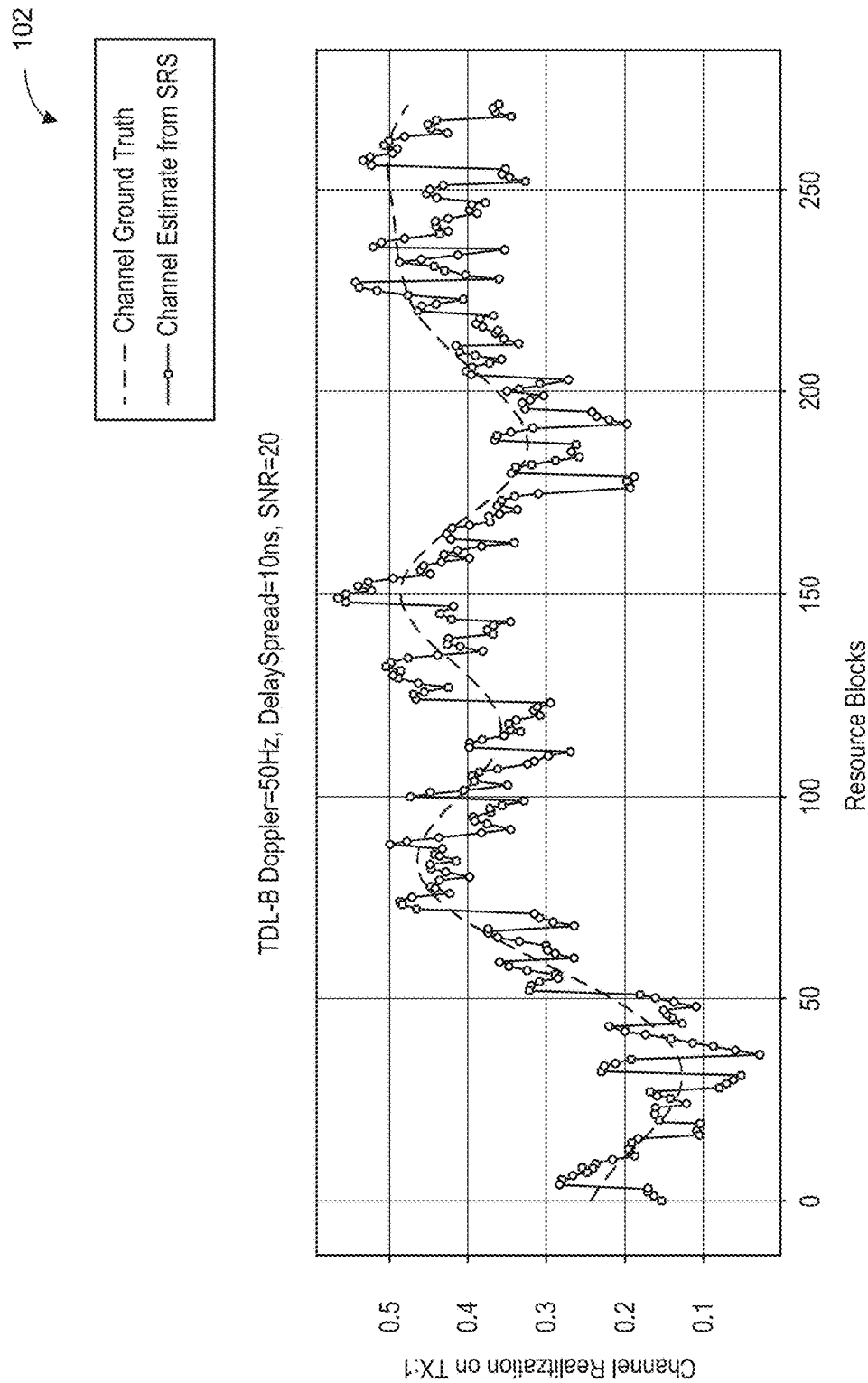
FIG. 1B is an example illustration of channel subcarrier frequency correlation, according to one embodiment.

FIGS. 1A and 1B illustrate examples of common problems in channel estimation due in part to under-sampling. One problem of channel estimation is channel aging, which can be visualized at FIG. 1A. FIG. 1A illustrates the underlying channel realization (dotted, labeled channel ground truth) and the estimated channel response from the SRS signal (solid with circles, labeled channel estimate from SRS) from a tapped delay line (TDL) model B channel as defined in ETSI TR 138.901 v.16.1.0 (2020-11) 5G; Study on channel model for frequencies from 0.5 to 10 GHz herein incorporated by reference, with a delay spread of 10 nanoseconds, and a doppler of 50 Hz, with a signal to noise ratio (SNR) of 20 dB, for a given resource block as it changes over time. As illustrated, current 5G solutions may transmit an [S] slot to send an SRS to generate a channel estimate for subsequent [D] slots. For example, as seen in FIG. 1A, channel estimates based on a reference signal are conducted every ten slots (e.g., SDDDDDDDDD). In each [S] slot, an SRS is transmitted from which a channel estimate can be performed and statically used for the following nine [D] slots. When the channel's coherence time is long enough relative to the periodicity of SRS, i.e., the channel's response is not expected to change over the next 10 slots, such a scheme may provide adequate performance. However, when the channel coherence time is small such that the channel is expected to meaningfully vary over the next 9 slots, the previous [S] slot's channel estimate can be considered "aged," i.e., no longer necessarily an accurate representation of the channel response, when applied to subsequent [D] slots where the channel has changed. Channel aging is especially problematic in mobile environments with high doppler frequencies where the channel varies rapidly across time which often results in increased channel estimation error. Channel prediction combats channel aging by predicting the channel estimate for future [D] slots.

In addition, if the delay spread of the communication channel is large and the channel coherence bandwidth is small then the variation of the channel's response across the frequency bandwidth (i.e., subcarriers) is large. A resource block that contains only a single SRS for all subcarriers in that resource block may experience degraded performance due to increased channel estimation error for subcarriers that are further away from the subcarrier that transmits the SRS. The disclosed AI model may also be used to interpolate and predict the channel response for each subcarrier in a resource block across both frequency and time. An example of frequency correlation is shown in FIG. 1B. FIG. 1B illustrates the underlying channel realization (dotted, labeled channel ground truth) and the estimated channel response from the SRS signal (solid with circles, labeled channel estimate from SRS) from a tapped delay line (TDL) model B channel as defined in TR 138.901, with a delay spread of 10 nanoseconds, and a doppler of 50 Hz, with a signal to noise ratio (SNR) of 20 dB, for a given slot for all resource blocks. Frequency correlation refers to the relationship between adjacent frequency bins in a wireless communication system. In typical wireless systems, the channel response exhibits some level of frequency correlations, meaning that the channel response at one frequency bin is related to the channel response at neighboring bins.

Channel estimation algorithms use the SRS to estimate the channel response independently at each slot. This approach however, does not take into account the frequency correlation between adjacent slots. By taking into account the frequency correlation between adjacent slots, the methods disclosed herein provide more accurate channel estimation and improve the overall performance of the wireless communication system.

Figures 1, 11A:
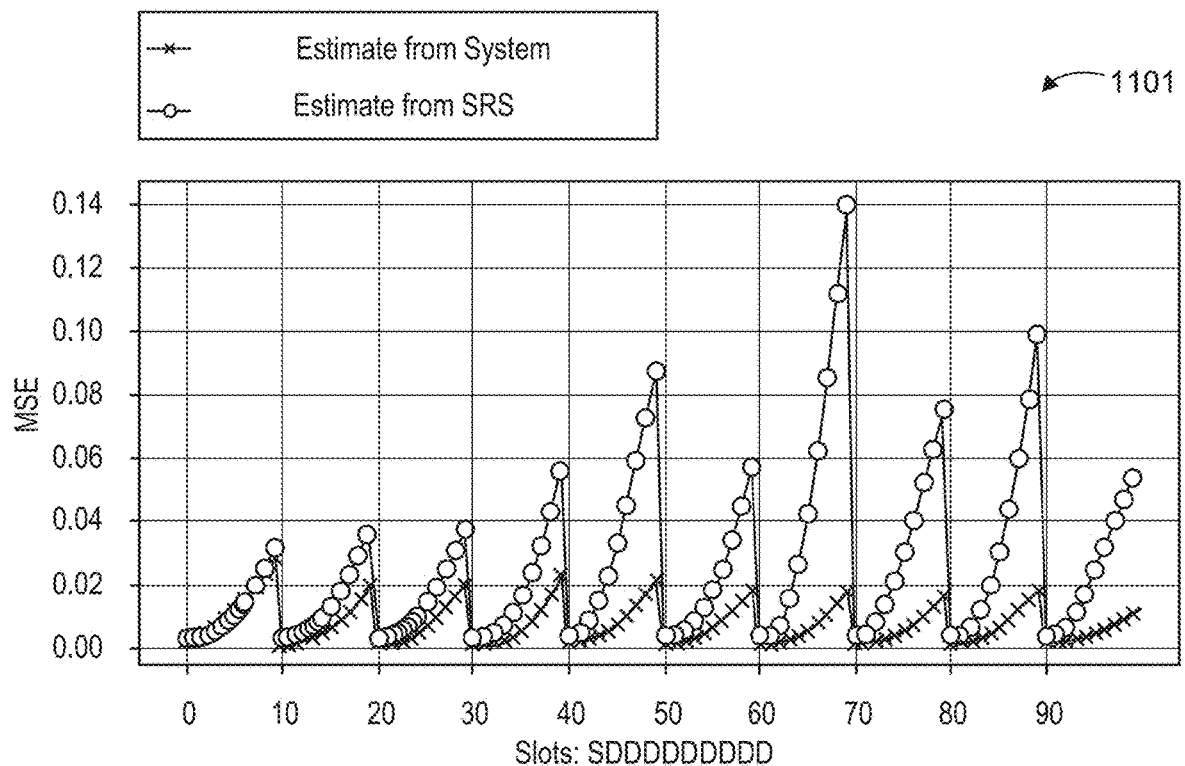
Figures 2, 11A:
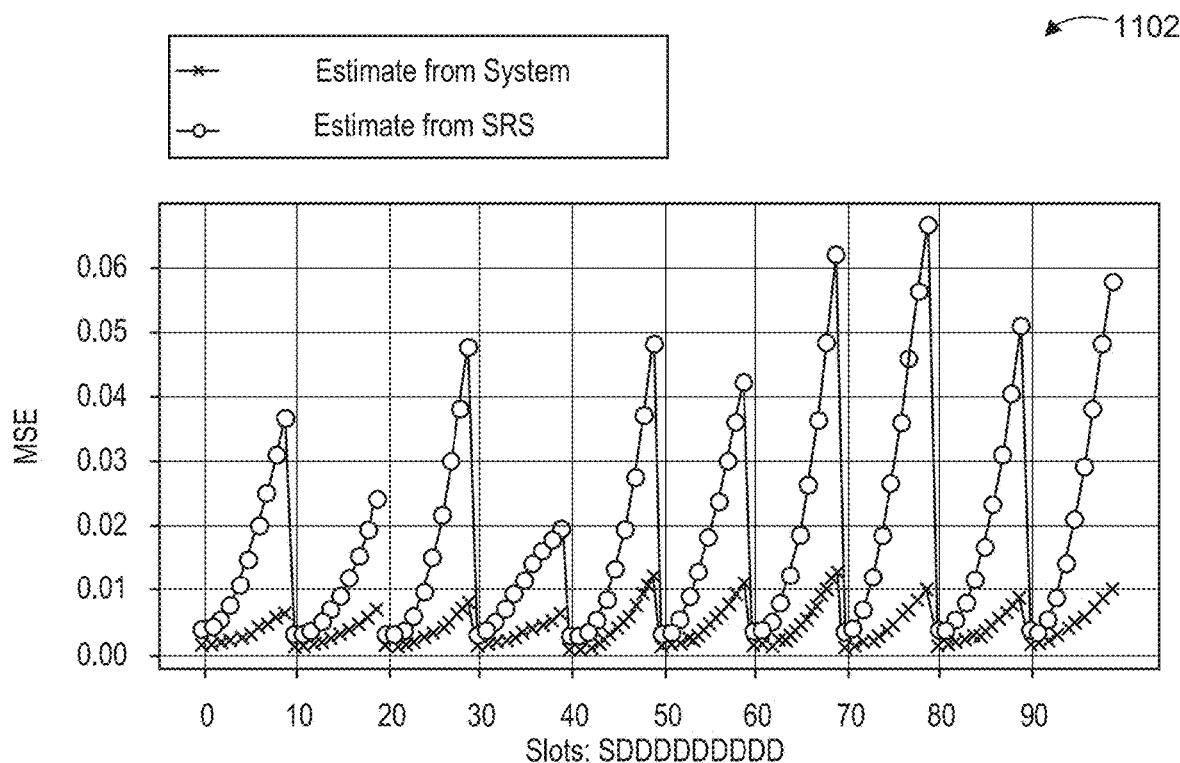

FIG. 2 is an example illustration of an OFDM resource grid 200 comprising a SRS signal, according to one embodiment. The OFDM resource grid 200 is a two-dimensional grid with the y-axis representing resource elements (REs or subcarriers) and the x-axis representing time in units of symbols within a slot. As seen in FIG. 2, the OFDM resource grid 200 includes a region of symbols denoted by SRS resources, where UEs may be scheduled to transmit SRS. In an example, two adjacent uplink (UL) symbols 205 comprising an SRS from the UE to the base station for channel estimation is illustrated. Each frame can include uplink physical uplink shared channel (PUSCH) data elements and/or downlink physical downlink shared channel (PDSCH) data elements. For time division duplex (TDD) systems (where the same frequency band and the same set of subcarriers are used for both downlink and uplink transmissions) it is possible to estimate the channel in the uplink direction at the base station, and beamform in the downlink direction by transmitting the SRS in a special slot scheduled by the base station. The special slot can be scheduled both aperiodically and periodically (e.g., for example, every 10 slots or alternatively every 5 slots etc.).

Figure 3A:
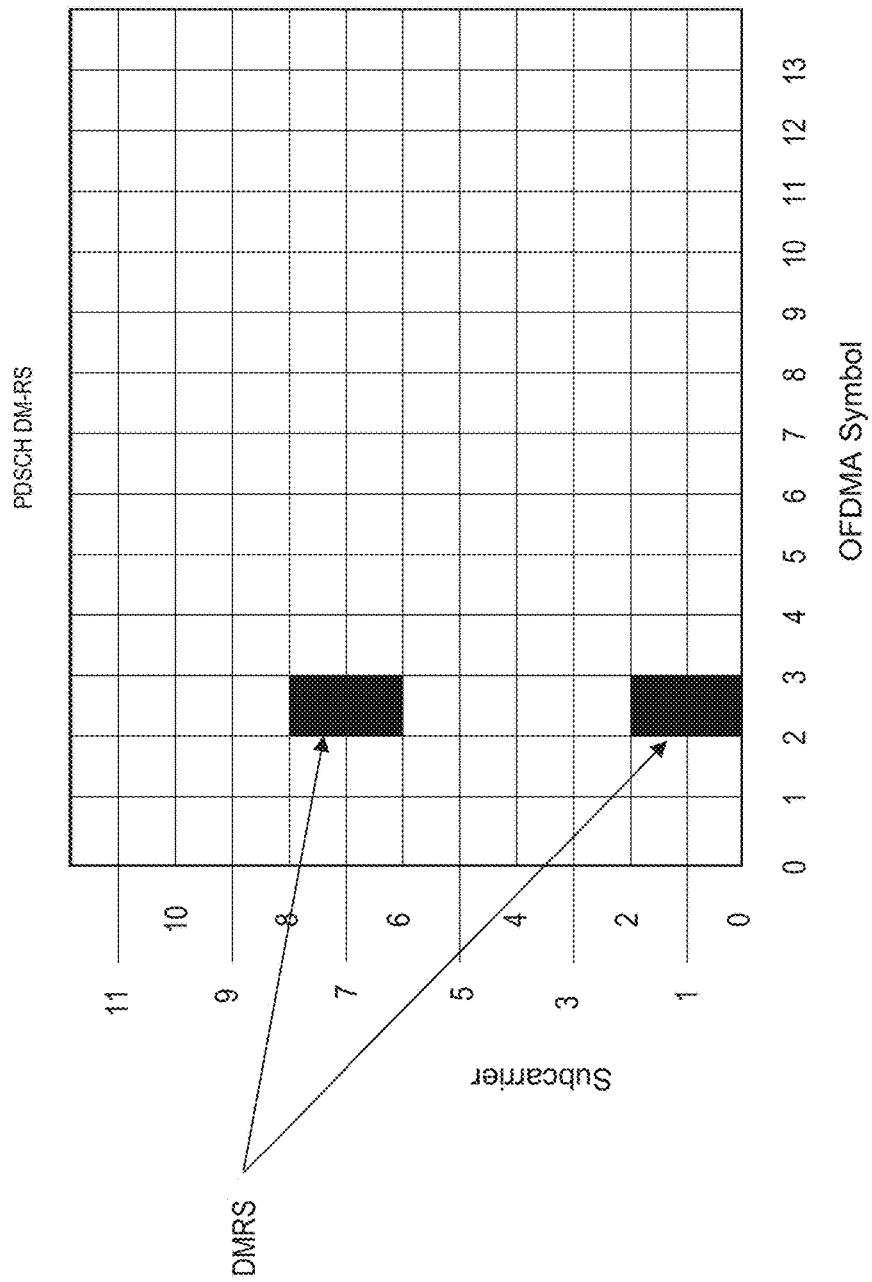
FIG. 3A is an illustration of an example OFDM resource grid with a single demodulation reference signal (DMRS), according to one embodiment.
Figure 3B:
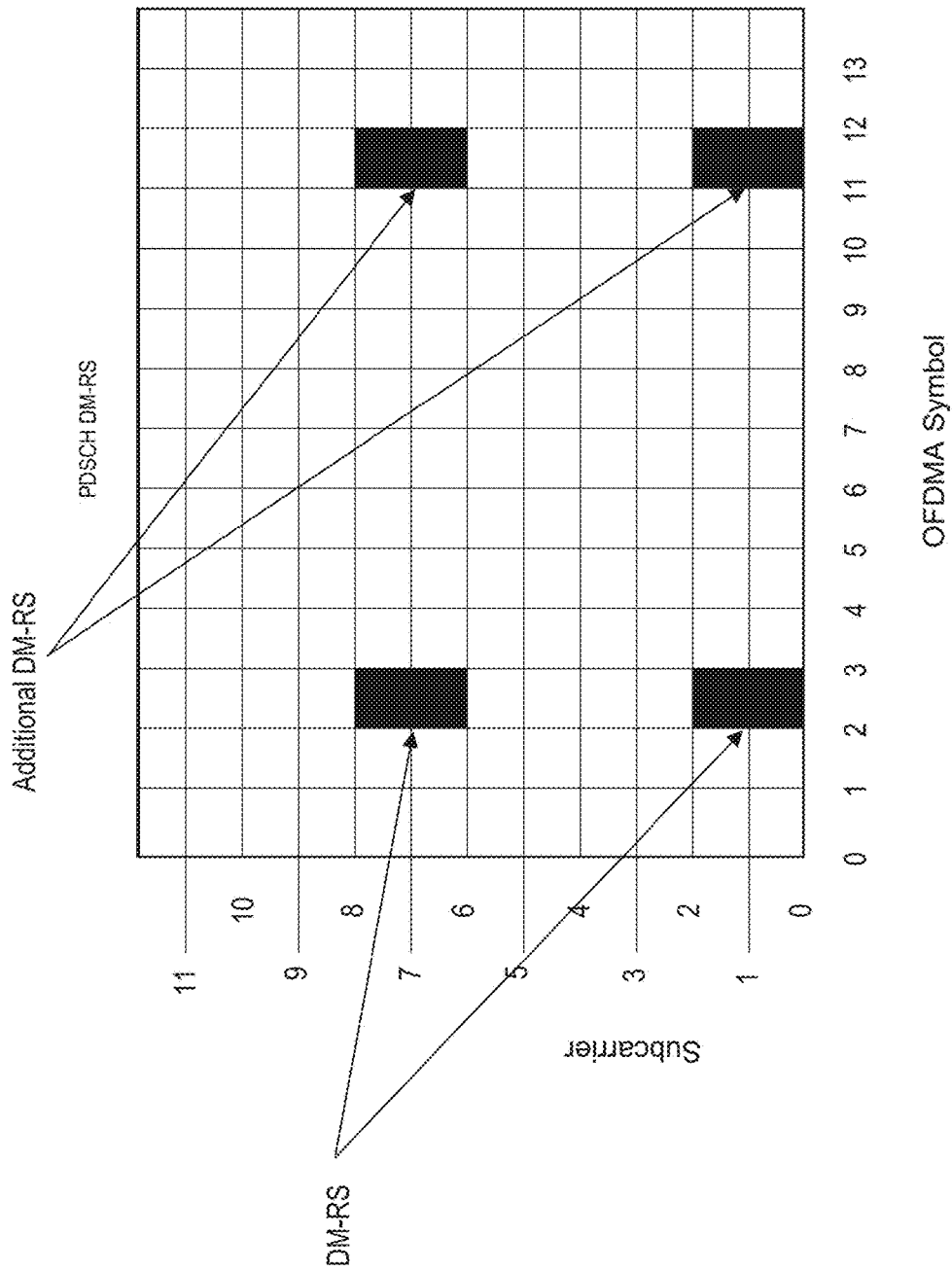
FIG. 3B is an illustration of the example OFDMA resource grid of FIG. 3A with an additional DMRS), according to one embodiment.

FIG. 3A is an example illustration of an OFDM resource grid comprising a single demodulation reference signal (DMRS) for the physical downlink shared channel (PDSCH). FIG. 3B is an example illustration of an OFDM resource grid comprising an additional DMRS for the PDSCH. The DMRS is a reference signal that can be used in both the downlink and uplink transmission for channel estimation and equalization during demodulation and decoding. In downlink and uplink transmission, the DMRS may be transmitted in the same resource block (RB) as data on the PDSCH and PUSCH.

In an embodiment, each slot has at least one dedicated DMRS symbol which may support 4 layers for DMRS type A, and 6 layers for DMRS type B. Support for more layers may also be included as necessary by extending the design of the DMRS to maintain orthogonality or pseudo-orthogonality as necessary. The DMRS is typically located on the $2^{nd}$ or $3^{rd}$ symbol of the slot, which can be expanded to include neighboring symbols if needed (e.g., $2^{nd}$ and $3^{rd}$ symbols or $3^{rd}$ and $4^{th}$ symbols). In addition, as illustrated in FIG. 3B, the slot may also be configured to include an additional DMRS symbol later in the slot which may also be used for channel estimation purposes. This additional DMRS symbol may be beneficial in scenarios where the channel coherence time is small and the channel undergoes rapid changes within the duration of the slot. As illustrated in FIG. 3A, the DMRS is transmitted in subcarriers 0, 1, 6 and 7 of symbol 2, and in FIG. 3B in subcarriers 0, 1, 6, 7 of symbols 2 and 11.

FIG. 4A is an example illustration of a low-resolution TDIR 401 channel estimate over time (slots) and frequency (resource blocks) using a SDDDDDDDDD pattern. FIG. 4B is an example illustration of a high-resolution ground truth TDIR 404 of the channel's actual response over time and frequency. For both the low-resolution channel estimate TDIR and high-resolution ground truth TDIR the y-axis represents frequency in units of resource blocks representing a plurality of RBs spanning the entire channel bandwidth and the x-axis represents time in units of slots. For example, as seen in FIGS. 4A and 4B, each TDIR represents 100 slots in time across the x-axis and 300 RBs worth of frequency bins across the y-axis.

As seen in FIG. 4A, the low-resolution TDIR 401 channel estimate includes a plurality of frames 430 in low resolution. The plurality of low resolution frames 430 results due to an "undersampling" of the channel in time. For example, in a SDDDDDDDDD configuration, the SRS is transmitted in only one slot out of ten slots. The channel estimate that is obtained from the sole S slot is used for the subsequent D slots for transmitting data. Accordingly, in an SDDDDDDDDD configuration, the channel estimate for the 9 data slots is based on a single SRS slot. However, as seen in the high-resolution ground truth TDIR in FIG. 4B, the channel may actually vary over that time span. Due to these channel variations, using a channel estimate that is updated only once out of every ten slots may not be sufficient to properly track a highly variable channel and may lead to degraded performance. Also shown is a column vector 445, which is discussed in detail below.

The plurality of high resolution frames in the ground truth high-resolution TDIR may be used to train the AI models described herein. As described in further detail regarding FIGS. 5A, and 5B, the high resolution TDIR of FIG. 4B may be used by the system to train an AI model to output a high-resolution TDIR channel estimate by comparing against the ground truth high-resolution TDIR by applying AI/ML recognition algorithms to determine patterns between the low-resolution TDIR channel estimates obtained from the SRS applied as an input to the AI model and the high-resolution ground-truth TDIR. For example, in an embodiment, the AI model may be trained by comparing a high-resolution output channel estimate TDIR X generated by the AI model to the high-resolution ground truth TDIR of FIG. 4B. By comparing the high-resolution output TDIR to the high-resolution ground truth TDIR in FIG. 4B, the AI model can be trained to recognize image patterns/relationships between the low resolution TDIR and the high-resolution ground truth TDIR.

Figure 5A:
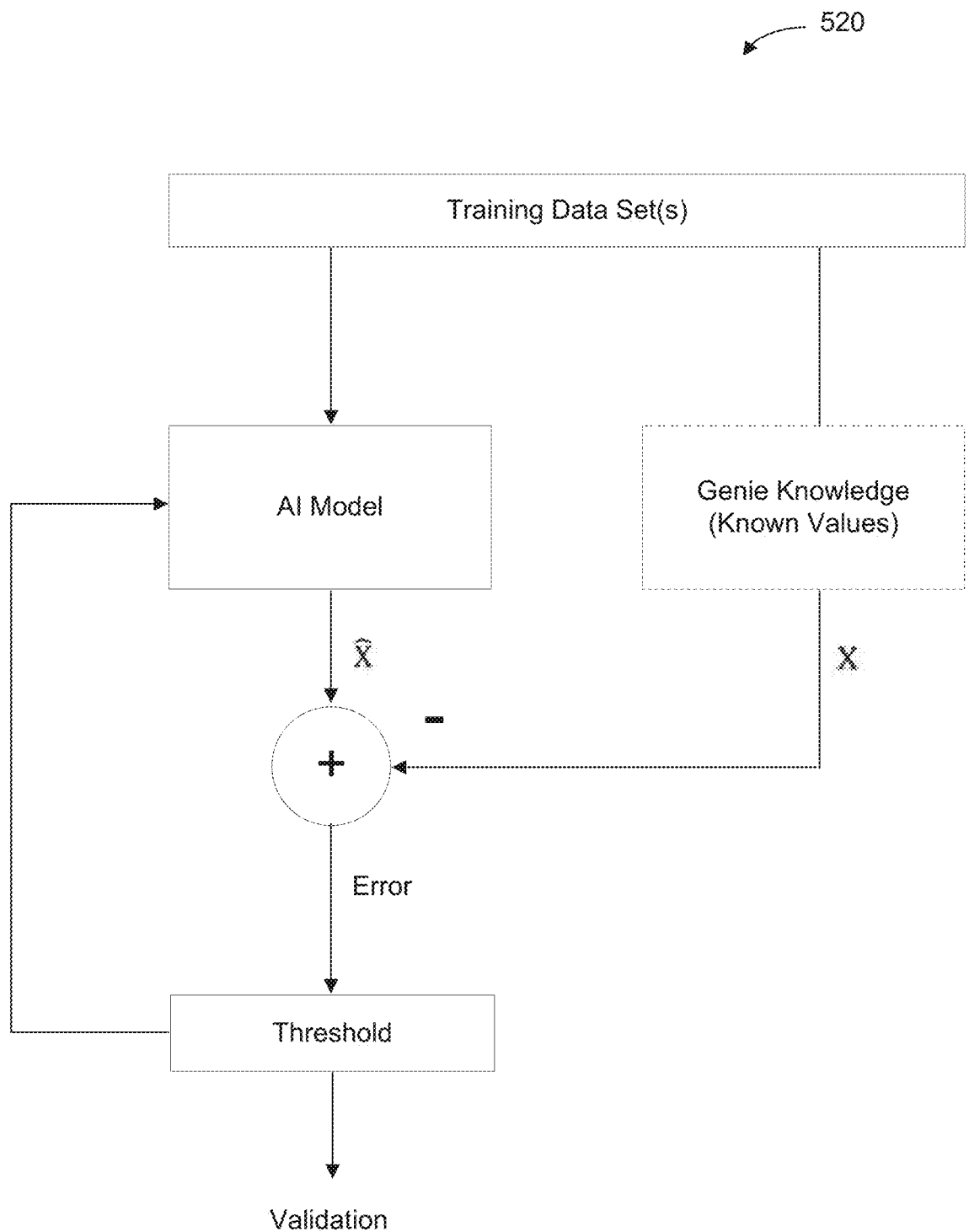
FIG. 5A is an illustration of an example method of training the AI model, according to one embodiment.

FIG. 5A is a block diagram 520 of an example process of training the AI models disclosed herein, according to one embodiment. Training of the AI models can be performed wholly on the system, or in part, e.g., with a remote/cloud infrastructure. Training each AI model includes inputting one or more training data sets into the AI model. The training can include receiving a low-resolution input channel estimate TDIR comprising a plurality of RBs and slots, generating a high-resolution output TDIR, and comparing the high-resolution output TDIR to the high-resolution ground truth TDIR. For example, in an embodiment, the training data may for one TDIR may include the low-resolution TDIR of FIG. 4A comprising 300 RBs and 100 slots. Training data simulating a high-resolution ground truth TDIR may be used as a known value (i.e., a ground truth to train an artificial neural network. The ground truth sometimes colloquially referred to as a "genie value") to train the AI model. For example, in one embodiment, the high-resolution ground truth channel realization TDIR can include the high-resolution ground truth TDIR of FIG. 4B. In an embodiment, ground truth data is created using a wireless channel simulator capable of generating a high resolution TDIR comprising a plurality of high-resolution frames for each RB.

The training data sets over which the system is trained may include the two major 5G channel models: tapped delay line (TDL) and clustered delay line (CDL). In an embodiment, the TDL channel model may be representative of a multipath Rayleigh fading channel for non-line-of-sight (NLOS) or a multipath Rician fading channel for line-of-sight (LOS) scenarios. For example, 5G specifies 5 different channel models labeled A-E each representing a specific environment, including power delay profiles for up to 23 paths corresponding to the specific environment. For MIMO scenarios, the channel model may also model the MIMO channel as independent across each transmit-receive antenna pair, or with some level of configurable correlation. The CDL model augments the TDL model, by modeling delayed clusters of rays received with the same delay but differing geometric characteristics such as angle/zenith of departure at the transmitter or angle/zenith of arrival at the receiver. The CDL model may also incorporate the spatial orientation of the receive antenna arrays. In an embodiment the AI model is trained on as many channel models as necessary for the planned deployment, e.g. a rural deployment uses channel models that are representative of its physical environment which may be different than a deployment in a dense urban environment.

The one or more training data sets are used by the AI model to generate a high-resolution TDIR channel estimate $\hat{X}$. In an embodiment, the estimate X includes a high-resolution output complex-valued TDIR, separated into a real-value TDIR and an imaginary-valued TDIR, for the future slots where no reference signal is transmitted. The estimate X can be compared to the known genie values (the high resolution ground truth TDIR) X to determine an error. The genie known values X may be a known decision for the training data set. If the error rate is less than a threshold value, the AI model is validated (e.g., tested) using testing data. If the error rate is greater than a threshold value, the AI model is retrained using the error to adjust one or more parameters of the one or more machine learning (ML) methods disclosed herein. For example, the AI model during the training phase may use a low-resolution channel estimate TDIR to generate a high-resolution output channel estimate TDIR. The high-resolution output channel estimate TDIR can be compared to a high-resolution ground truth channel realization TDIR. Using pattern recognition, the system can compare the high-resolution ground truth channel realization TDIR with the high-resolution output channel estimate TDIR to determine patterns between the low-resolution input channel estimate TDIR and the high-resolution ground truth channel realization TDIR. These patterns may be used to train the AI model to accurately generate the high-resolution TDIR based on the low-resolution input TDIR. In an embodiment, the ground truth includes a simulated high-resolution ground truth channel realization TDIR comprising a plurality of high-resolution frames. The high-resolution output channel estimate TDIR generated by the AI model can be compared to the simulated high-resolution ground truth channel realization TDIR. If the AI model scores beneath a threshold error rate (e.g., the AI model incorrectly predicted the complex-valued channel estimate in either the real or imaginary components or both), then the AI model can be re-trained via a feedback loop.

Figure 5B:
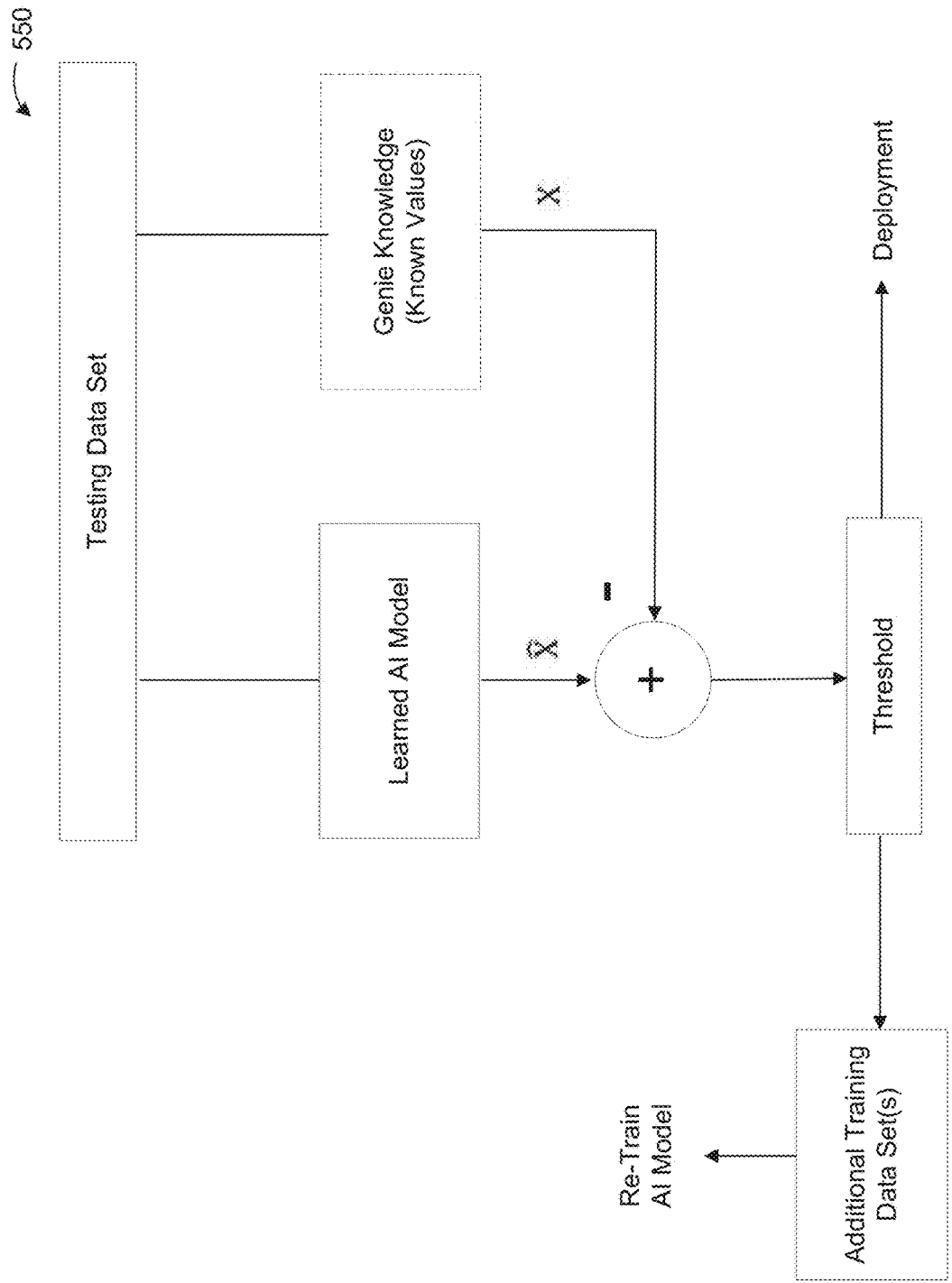
FIG. 5B is an illustration of an example method of testing the AI model, according to one embodiment.

FIG. 5B is a block diagram 550 of an example process of validating the AI model disclosed herein, according to an embodiment. Validating the AI model includes inputting a testing data set different from the training data set into the trained AI model. The testing data set can include one or more low-resolution channel estimate TDIR (e.g., a first TDIR, second TDIR, third TDIR, etc.). The testing data set is used by the AI model to generate a decision $\hat{X}$. The decision $\hat{X}$ can include a high-resolution output channel estimate TDIR representing the complex-valued channel estimate for future slots where no reference signal is present. The decision $\hat{X}$ is compared to known genie values (the high resolution ground truth channel realization TDIR) X to determine an error rate. If the error rate is less than a threshold value, the AI model is deployed. If the error rate is greater than a threshold value, the AI model is re-trained using additional training data sets. The re-training procedure can mirror the training procedure described in FIG. 5A.

Figure 6:
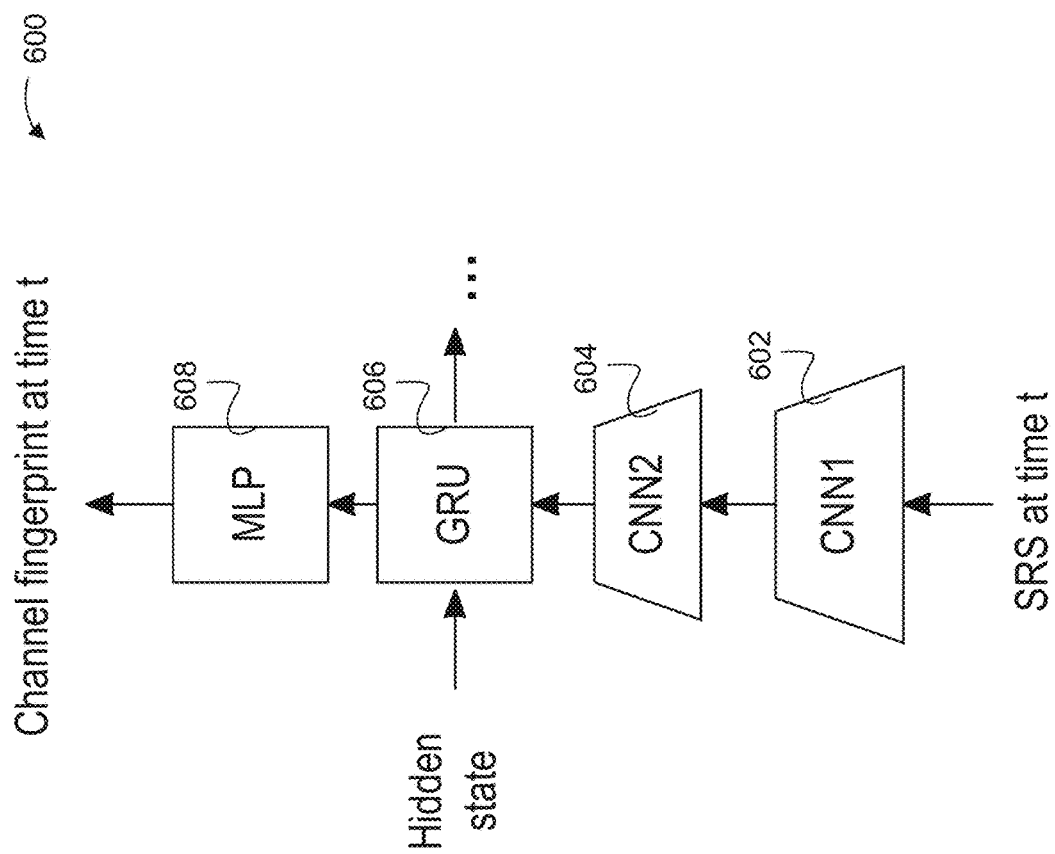
FIG. 6 is an illustration of an example structure of an AI model for channel estimation and prediction, according to one embodiment.

FIG. 6 is an example structure 600 of an AI model configured to accurately fingerprint the channel based on a transmitted SRS. The structure 600 includes a plurality of layers comprising a first convolutional neural network (CNN) layer 602, second CNN layer 604, a gated recurrent unit (GRU) layer 606 and a multilayer perception (MLP) layer 608. It should be noted that while layer 606 is described as a GRU, any recurrent artificial intelligence (AI) model may be used. By way of non-limiting examples, layer 606 may be implemented as a recurrent neural network (RNN) or a long short-term memory (LSTM) network.

The high dimensionality of input data can be alleviated using the first CNN layer 602. The first CNN layer 602 and second CNN layer 604 can be used to reduce the input dimension to a smaller feature space and determine a correlation between adjacent channels. The GRU is a recurrent neural network that is used to process sequential data. The GRU can be applied on top of the CNN structure to track past histories. The past information can be encoded into a hidden state and applied as an input to the GRU layer. The hidden state can contain useful historical information from previous slots and/or frames. The structure 600 can access the hidden states via the MLP layer. The features can be normalized and averaged to allow the MLP layer to include fixed size inputs. As described above, the CNN layers may be trained with supervised learning. At each time slot: (i) the output of the neural network is computed, and (ii) the error between the output and the ground truth is computed, and the network is updated using back propagation. In addition to the CNN layer, a recurrent neural network (RNN) layer, of which a GRU is an exemplary embodiment of an RNN, can be used to track previous historical items (e.g., past states). In other embodiments, the various neural networks (e.g., CNN1, CNN2, GRU, MLP) may also be implemented using a Transformer neural network model as in known in the art. In still other embodiments, the various neural networks (e.g., CNN1, CNN2, GRU, MLP), may also be implemented using canonical blocks such as a Fourier transform or inverse Fourier transform.

As illustrated in FIGS. 7A-7C, based on the SRS for all [S] slots up to and including time t, the system may generate a channel fingerprint at time t, representing an estimate of the channel's doppler, delay spread, and signal to noise ratio. For example, FIGS. 7A-7C illustrate the system's estimate of these parameters over time, and illustrates accurate fingerprinting of the channel with a 125 Hz doppler, a 10 nanosecond delay spread, and a SNR of 10 dB.

FIGS. 7A-7C illustrate channel fingerprinting results of the system given a true doppler of 125 Hz, a true delay spread of 10 nanoseconds, and a true SNR of 10 dB. The example illustrations include the fingerprinting results of the doppler (FIG. 7A), delay spread (FIG. 7B) and SNR (FIG. 7C). Each of FIGS. 7A through 7C, includes a dotted line 708 representing the actual real value of the estimated channel parameter (i.e., the ground truth), a line 710 representing the estimated value, and a shaded region representing a variance range. The variance range in all plots represents uncertainty in the results. The variance range includes an upper bound 712 and lower bound 714. As illustrated in FIGS. 7A-7C, for an SRS periodicity of SDDDDDDDDD and subcarrier frequency spacing of 30 kHz, an embodiment transitions from initial acquisition and pull-in to tracking of the estimated channel parameters with reduced variance after about 10 SRS slots, demonstrating accurate channel fingerprinting. With each additional SRS, the system is able to continuously refine its channel fingerprint to more accurately predict the real value 708. For example, upon receiving an additional SRS at slots 10, 20, 30 and 40, the system is able to improve its estimate 710 to accurately fingerprint the real value 708.

FIG. 8A is an illustration of a channel prediction architecture, according to an embodiment. FIG. 8A includes a first channel prediction (CP) model 810A and second CP model 810B. The first CP model 810A is configured to receive a channel estimate signal as a column vector at time t based on the transmitted SRS in an [S] slot as an input. In addition to the SRS input column vector, the CP model 810A may also be configured to receive hidden state history data as an input. The history may be used to track information based on previous slot information. By combining the hidden state history data and the channel estimate from the SRS, the CP model 810A can use both the hidden state data and the SRS to generate a channel prediction for the next k slots. In an embodiment, the k slots include non-SRS slots. For example, based on the previous hidden state information and the current channel estimate from the SRS, the CP model can output a channel prediction for the non-SRS slots within the frame. The second CP model 810B can generate a channel prediction in a time series manner. In some embodiments, CP model 810B can be implemented in the same manner as CP model 810A. For example, given an SRS input at time t+k+1, the second CP model 810B can generate a channel prediction from time t+k+1 to t+2k+1.

FIG. 8B is an illustration of a channel fingerprinting architecture, according to an embodiment. FIG. 8B includes a first channel fingerprinting (FP) model 820A and a second channel FP model 820B. The first channel FP model 820B is configured to receive a channel estimate signal as a column vector at time t based on the transmitted SRS in an [S] slot as an input. In addition to the SRS column vector input, the first channel FP model 820A may also be configured to receive hidden state history as an additional input. Hidden state history information may be applied as an input to the first FP model 820A and second FP model 820B. The first FP model 820A may be configured to combine hidden state history and the channel estimate based on the SRS to fingerprint the slot at time t. As seen further in FIG. 8B, the second FP model 820B can fingerprint the channel in a time-series manner. For example, the second FP model 820B can fingerprint the channel at time t+k+1 given an SRS at time t+k+1. In some embodiments, FP model 820B may be implemented in the same manner as FP model 820A.

The fingerprinting output of the first FP model 820A and second FP model 820B may be used by various communication functions that benefit from knowledge of channel characteristics and/or user characteristics such as: (i) doppler, to determine how fast the UE is moving; (ii) delay spread, to determine the coherence bandwidth; (iii) SNR, to determine how strong the signal is from transmitter to receiver; and (iv) power delay profile, to determine channel characteristics (e.g., indoor/outdoor). The fingerprinting output of the first FP model 820A and the second FP model 820B can also be used to estimate application characteristics to determine throughput.

FIG. 8C is an illustration of a combined channel prediction and fingerprinting architecture, according to an embodiment. Portions of the CP model and the FP model can be combined to improve the efficiency and performance of the individual CP models (e.g., 810A and 810B) as disclosed in FIG. 8A, and the individual FP models (e.g., 820A and 820B) as disclosed in FIG. 8B. As illustrated in FIG. 8C, the combined channel prediction and fingerprinting architecture includes at least one FP model 840 and at least two CP models 830A and 830B. The combined channel prediction and fingerprinting method takes a channel estimate based on the SRS at time t and at time t+k+1 to accurately generate the channel's fingerprint and predict the channel estimate. For example, based on: (i) the channel estimate column vector based on the SRS at time t; (ii) the channel estimate column vector based on the SRS at time t+k+1; and (iii) hidden state information (including information from the channel fingerprinting), the combined channel prediction and fingerprinting method can generate a channel prediction from time t+1 to t+k, a channel prediction from time t+k+1 to t+2k+1, and a channel fingerprint at time t+k.

Figure 9:
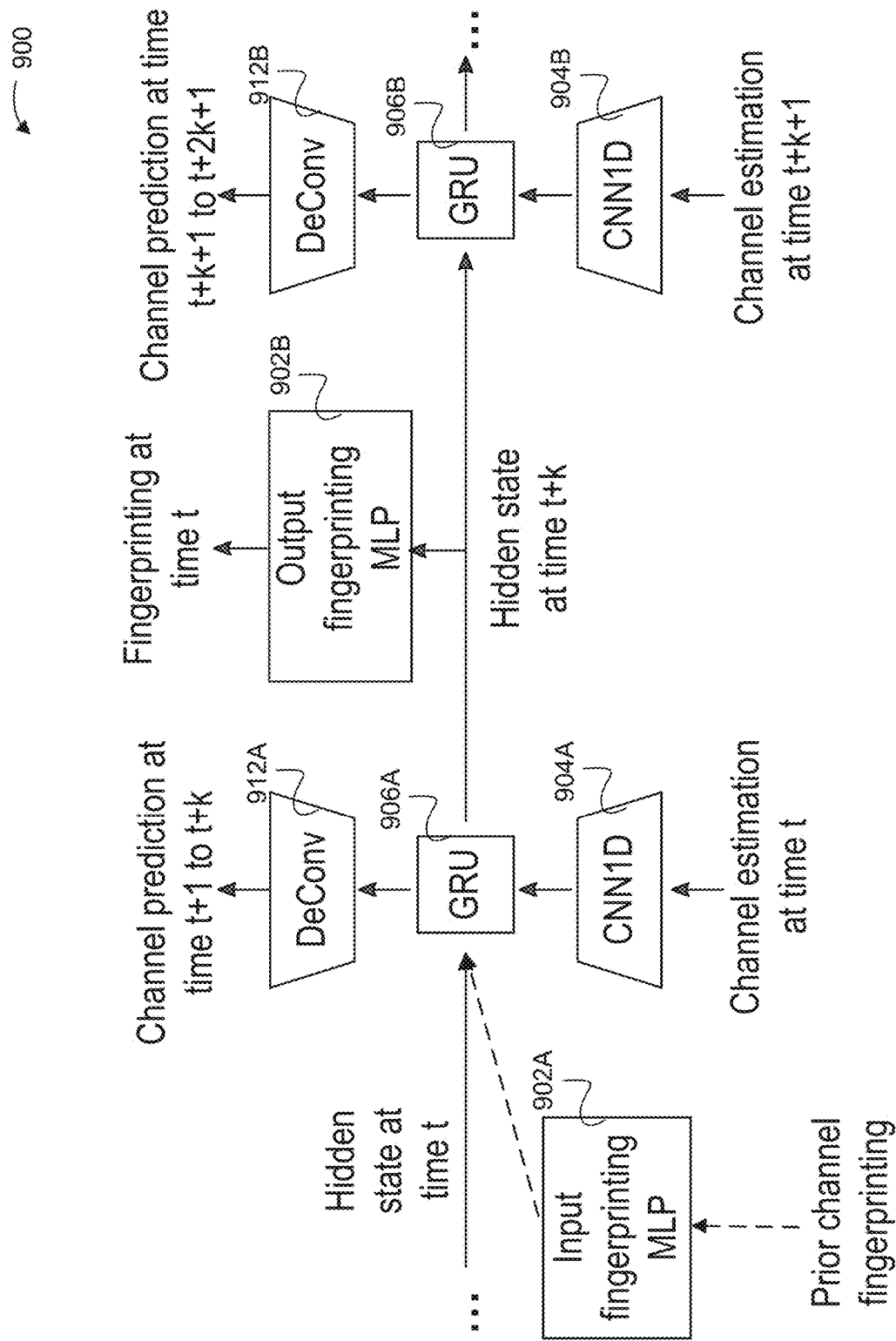
FIG. 9 is an illustration of an example structure of an AI model for channel prediction and fingerprinting, according to one embodiment.

FIG. 9 illustrates an AI model structure 900, according to an embodiment. The structure 900 includes an input fingerprinting MLP layer 902A to provide prior channel fingerprinting information to the structure 900 and an output fingerprinting MLP layer 902B to generate a fingerprinting at time t+k based on hidden state data at time t+k applied as an input to the output fingerprinting MLP layer 902B. The structure 900 further includes a first GRU layer 906A and second GRU layer 906B to process sequential data, a first CNN layer 904A, second CNN layer 904B, first de-convolutional layer 912A and a second de-convolutional layer 912B to generate and output a channel prediction at t+1 and t+k at the first de-convolutional layer 912A and output a channel prediction from time t+k+1 to t+2k+1 at the second de-convolutional layer 912B.

The first GRU layer 906A is configured to receive both hidden state data at time t and the output from the first CNN layer 904A. In an embodiment, the first GRU layer 906A is further configured to receive prior channel fingerprinting data via the input fingerprinting MLP layer 902A. The structure 900 may use channel estimates based on the SRS at times t and t+k+1 to fingerprint the channel at time t+k and generate a channel prediction at time t+1 to t+k and a channel prediction at time t+k+1 to t+2k+1. For example, the first CNN layer 904A can be configured to receive a channel estimate at time t based on the SRS as an input to the first CNN layer 904A. The second CNN layer 904B can be configured to receive a channel estimate at time t+k+1 based on the SRS as an input to the second CNN layer 904B. The structure 900 can use the prior channel fingerprinting, hidden state data at time t, hidden state data at time t+k, the channel estimate at time t, and the channel estimate at time t+k+1 to determine the channel prediction at time t+1 to t+k and channel prediction at time t+k+1 to t+2k+1 and fingerprinting at time t+k. In other embodiments, the various neural networks (e.g., CNN1D, GRU, DeConv) may also be implemented using a Transformer neural network model as in known in the art. In still other embodiments, the various neural networks (e.g., CNN1D, GRU, DeConv), may also be implemented using canonical blocks such as a Fourier transform or inverse Fourier transform.

Figure 10:
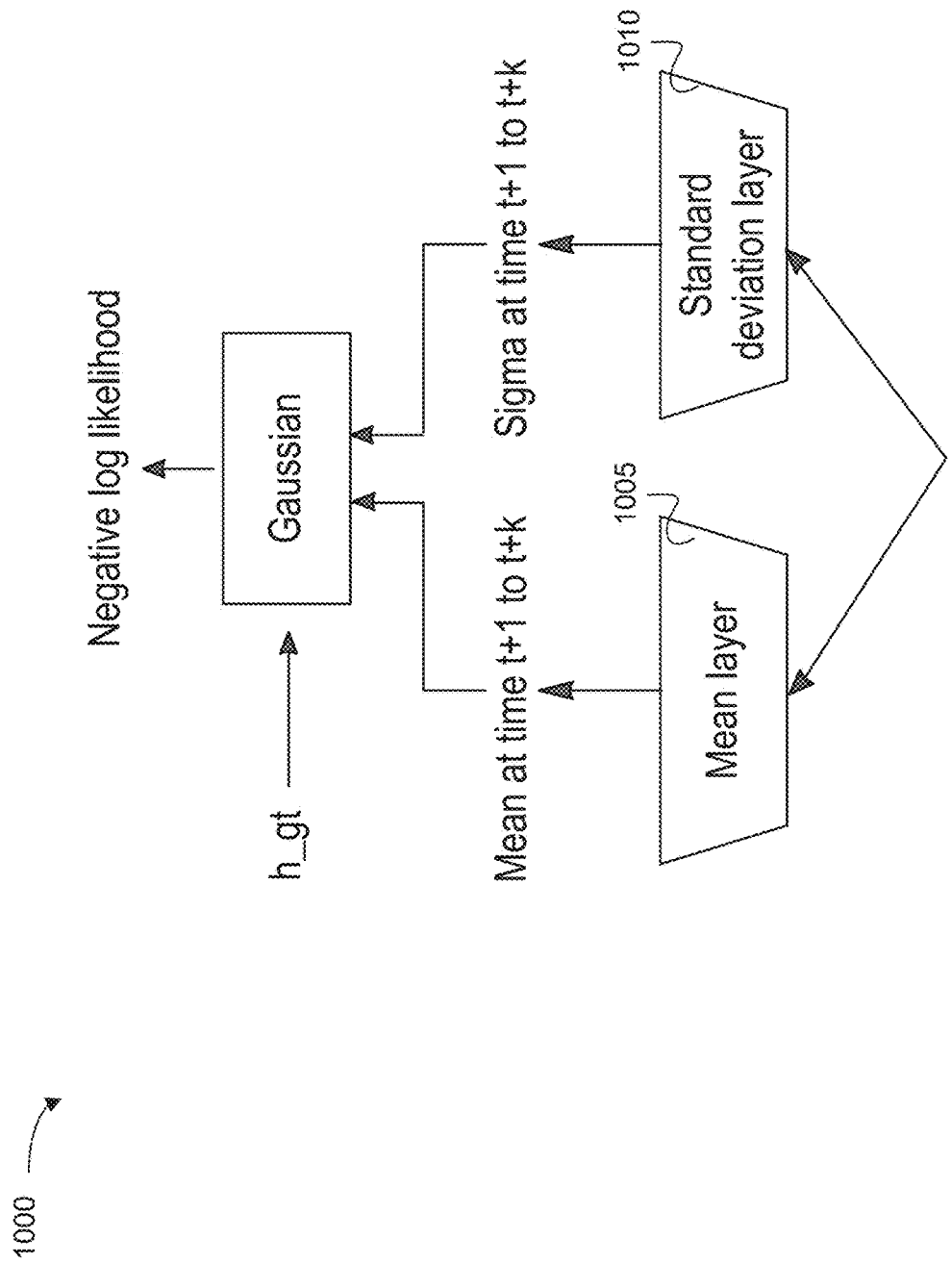
FIG. 10 is an illustration of an example structure of an AI model for channel prediction and fingerprinting, according to one embodiment.

FIG. 10 is an illustration of an AI model structure 1000 that contains two head layers for computing mean and standard deviation of channel characteristics such as doppler, delay spread, and SNR, that may be used in conjunction with a gaussian distribution to compute a negative log likelihood ratio (negLLR) that may be used to train the system according to an embodiment. In an embodiment, the structure can include two heads (e.g., a first head for mean, and a second head for standard deviation). A "head" typically refers to the final layer or set of layers in a neural network that is/are responsible for producing the final output. As illustrated in FIG. 10, the structure includes a mean layer 1005 and a standard deviation layer 1010. Each layer produces a separate output. Having two heads allows the model to capture more information about the distribution of data and can be particularly useful in cases where the distribution is non-uniform or has high variance.

In an embodiment, the AI model can be trained using uncertainty measures to maximize the negative log likelihood ratio (negLLR), which effectively minimizes the weighted mean square error between the AI model channel prediction and the channel realization ground truth. The negLLR may be derived as:

$$MSE = \sum \|h_{nn} - h_{gt}\|^2$$

$$negLLR = \sum(-\log(G(\mu, \sigma; h_{gt}))) = \sum(-\log(G(h_{nn,mean}, h_{nn,std}; h_{gt}))) =$$

$$\sum\left(-\log\left(\frac{1}{\sqrt{2\pi}\, h_{nn,std}}\exp\left(\frac{(h_{nn,mean} - h_{gt})^2}{(h_{nn,std})^2}\right)\right)\right)$$

$$negLLR = \text{Constant} + \sum h_{nn,std} + \sum \frac{\|h_{nn,mean} - h_{gt}\|^2}{\|h_{nn,std}\|^2}$$

Using uncertainty measures to maximize the negative log likelihood ratio may be a useful approach for training neural networks, particularly for tasks where uncertainty is an important factor in the predictions. By using negLLR, the AI model may be trained to predict not only the most likely output value but also the uncertainty associated with that prediction. This may be particularly helpful when the AI model's predictions need to be accompanied by a confidence measure or when dealing with noisy or uncertain input data. Minimizing the negLLR may be achieved by training the network to make more accurate predictions to reduce the uncertainty associated with those predictions. As illustrated in FIG. 10, the mean layer 1005 can be configured to generate an output comprising a mean at time t+1 to t+k, while the standard deviation layer 1010 can be configured to generate an output comprising a sigma at time t+1 to t+k. The output of the mean layer 1005 and the out of the standard deviation layer 1010 may be used as an input to a Gaussian function along with the channel realization ground truth to determine a negLLR for use as a loss function (as opposed to unaltered mean square error) when training the network as described above.

FIGS. 11A-1, 11A-2, 11B-1, 11B-2, 11C-1, 11C-2, 11C-3 illustrate examples of the performance of the system compared to conventional methods of channel prediction and fingerprinting. FIG. 11A illustrates the performance of the channel prediction of the system given a SDDDDDDDDD SRS configuration from a tapped delay line (TDL) model B channel as defined in TR 138.901, with a delay spread of 10 nanoseconds, and a doppler of 50 Hz, with a signal to noise ratio (SNR) of 20 dB, according to an embodiment. FIG. 11A includes a first chart 1101 and a second chart 1102. The x-axis represents time in units of slots. The y-axis represents the mean squared error between the channel prediction by the AI system with respect to the channel realization ground truth (solid line with x markers) and the channel estimate using a sample and hold estimate based on the SRS signal only (solid line with circle makers). FIG. 11A-1 illustrates the performance of the system with respect to channel prediction after the system has transitioned to tracking the channel variation, with no prior knowledge of the channel. FIG. 11A-2 illustrates the performance of the system after 500 milliseconds where initial acquisition, pull-in, and tracking have been performed and illustrates the stability of the system. Note, the scale of the y-axis of FIG. 11A-1 and FIG. 11A-2 are different.

Figures 1, 11B:
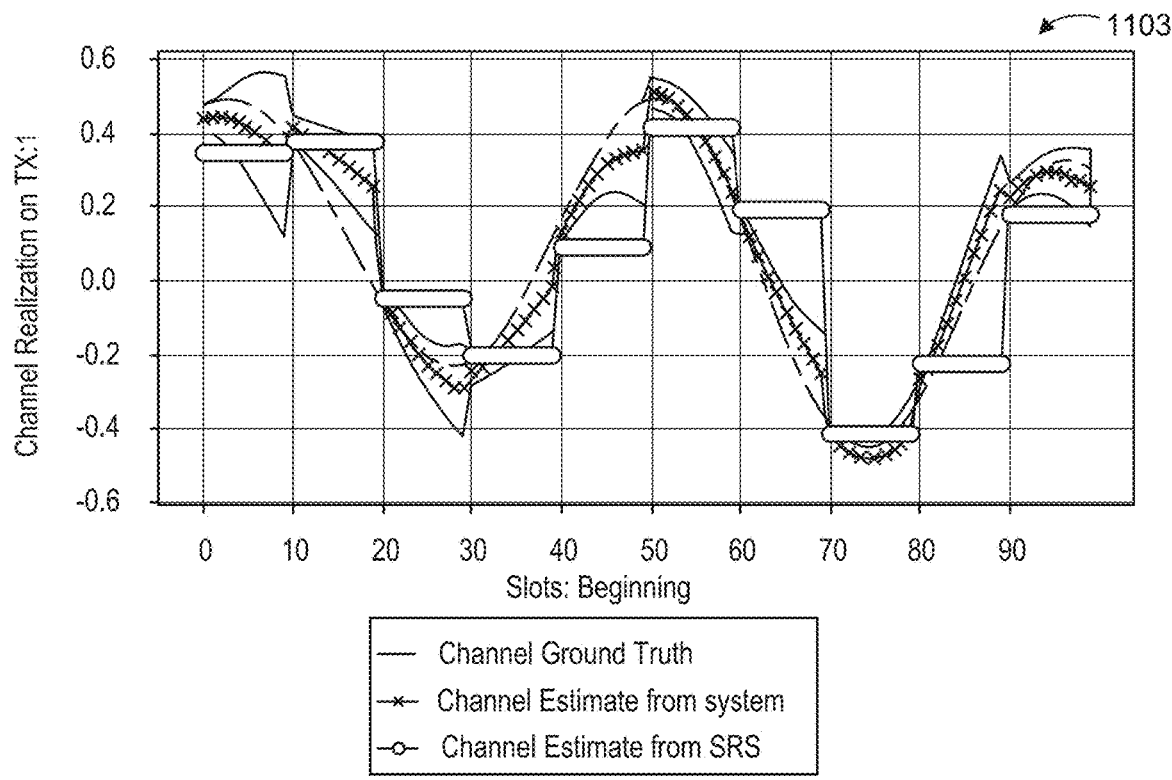
Figures 2, 11B:
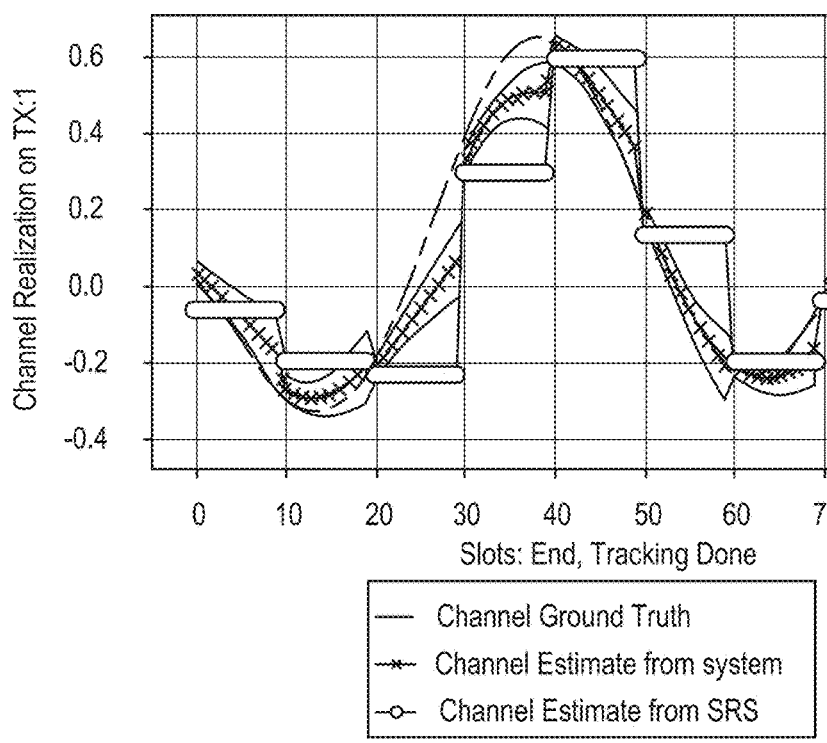
FIG. 2 is an illustration of an example OFDMA resource grid comprising a sounding reference signal (SRS) and resource blocks (RBs), according to one embodiment.

FIG. 11B illustrates the results of tracking one RB, according to an embodiment from a tapped delay line (TDL) model B channel as defined in TR 138.901, with a delay spread of 10 nanoseconds, and a doppler frequency of 50 Hz, with a signal to noise ratio (SNR) of 20 dB. FIG. 11B includes a first chart 1103 and second chart 1104. The x-axis represents time in units of slots. The y-axis represents the channel realization (real or imaginary component of the complex-valued channel response) on TX:1. FIG. 11B-1 illustrates the results of an embodiment at the beginning of tracking when the uncertainty is high. FIG. 11B-2 illustrates the results at the end of tracking. Both charts compare the channel realization ground truth (solid line), the channel prediction by the AI system (solid line with x markers) and the channel estimate using a sample and hold channel estimate based on the SRS signal only (solid line with rounded makers). As illustrated in both FIGS. 11B-1 and 11B-2, the disclosed system greatly improves the accuracy of the channel estimation and prediction.

FIG. 11C illustrates the channel fingerprinting performance of the system, according to an embodiment. In FIG. 11C, the x-axis represents time in units of slots. FIG. 11C-1 illustrates channel fingerprinting results based on a doppler of 50 Hz (solid line with circle markers). In FIG. 11C-1, the y-axis represents doppler in Hz. FIG. 11C-2 illustrates channel fingerprinting results based on a delay spread of 10 ns (solid line with circle markers). In FIG. 11C-2 the y-axis represents delay spread in nanoseconds. FIG. 11C-3 illustrates channel fingerprinting results based on a SNR of 20 dB (solid line with circle markers). In FIG. 11C-3, the y-axis represents SNR. The dotted area in all plots represents uncertainty in the results. Each of FIGS. 11C-1 through 11C-3, includes a dotted line 1108 representing a real value, a broken line 1110 representing an estimated value, and a shaded region representing a variance range. The variance range comprising upper bound 1112 and lower bound 1114. As seen in both FIGS. 11C-1 and 11C-2, given a SRS periodicity of SDDDDDDDDD, an embodiment accurately fingerprints the channel after about 5 SRS slots.

Figure 12:
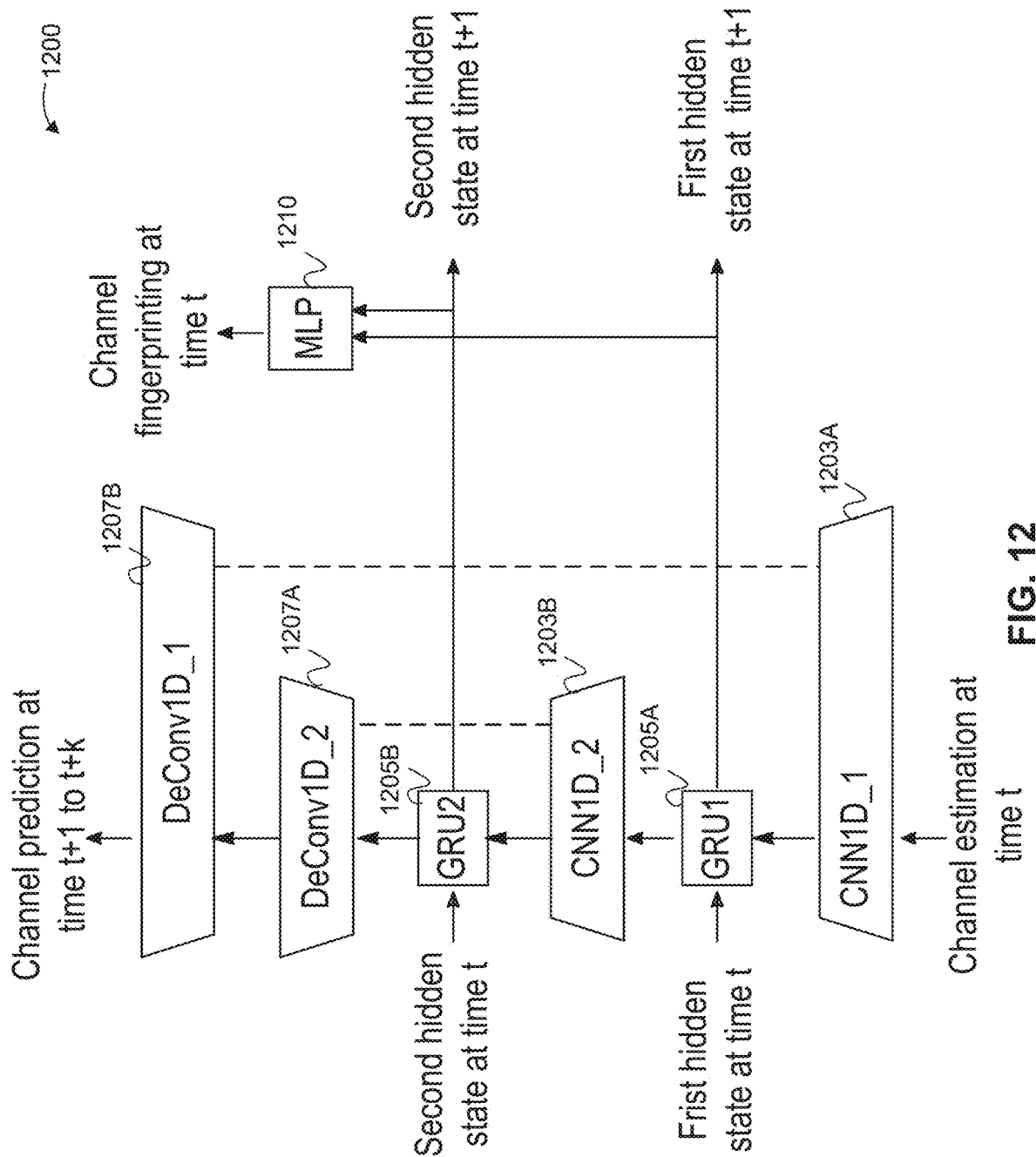
FIG. 12 is an illustration of an example u-shaped neural network UNET and recurrent artificial intelligence (AI) model structure of an AI model for channel prediction and fingerprinting, according to one embodiment.

FIG. 12 illustrates an example structure 1200 of an AI model configured to determine a channel prediction and fingerprinting, according to an embodiment. In this embodiment, the structure 1200 includes a u-shaped neural network structure (UNET) and GRU structure. The UNET architecture may be used for segmentation. The AI model may include four layers. The four layer UNET architecture may include two encoding layers, two decoding layers, and a bottleneck layer in the middle. The encoder may include a series of convolutional layers that reduce the spatial dimensions of the input image while increasing the number of channels, thereby learning high-level features. The decoder may be composed of transposed convolutional layers (e.g., deconvolution layers) that up-sample feature maps (i.e., the output of the convolutional layer in the neural network) to the original image size. Each encoding layer may be followed by a max-pooling layer to reduce the spatial dimensions of the feature maps. The decoding layers may include a deconvolutional layer followed by a concatenation layer to combine the feature maps from the corresponding encoding layer. The number of filters and kernel sizes may be adjusted depending on the specific task and dataset being used. Additionally, batch normalization, dropout, and other regularization techniques may be added to improve the performance of the model.

As illustrated in FIG. 12, the UNET structure may include two CNN encoder layers 1203A, 1203B and two de-convolution layers 1207A, 1207B. CNN layers 1203A and 1203B may process input data by applying a series of convolutional operations to extract high-level features from the input. The series of convolutional operations decrease the spatial resolution of the input image while increasing the number of feature maps. Each CNN layer 1203A, 1203B may include a non-linear activation function such as a rectified linear unit (ReLU), which introduces non-linearity into the model.

The output of the final CNN layer 1203B is a feature map that encodes high-level information about the input image. This feature map is then passed to a decoder (e.g., deconvolutional layer 1207A), which may be composed of transposed convolutional layers that increase the spatial resolution of the feature map while decreasing the number of feature maps.

In one embodiment, the number of layers may be increased. The UNET structure may also include residual skip connections to bypass one or more layers in the neural network. For example, in a dense UNET structure, residual connections may be used to connect the encoder and decoder paths of the network. The residual connections facilitate the flow of gradients during training and improve the overall performance of the model by connecting the encoder and decoder paths. The encoder paths include convolutional layers that down-sample the input image. The decoder path includes a series of deconvolutional layers that up-sample the feature maps to produce segmentation masks.

In one embodiment, the CNN layers 1203A and 1203B are configured to reduce the input (e.g., features). For example, if the original number of features is about 272, after two CNN layers, where each layer down samples the original number by a factor of d_1 and d_2, the number of features can shrink by a factor of 16. Both factors d_1 and d_2 can be tuned. For example in an embodiment, d_1 and d_2 can be tuned to d_1=4 and d_2=4.

Similarly to the structure in FIG. 6, one or more GRUs may be applied on top of the UNET structure to track past histories. The past information can be encoded into hidden states (e.g., a first hidden state at time t and a second hidden state at time t+1). The hidden states may contain useful historical information from previous slots. A GRU 1205A may be configured to receive first hidden state data at time t and the output of CNN layer 1203A. A second GRU 1205B may be configured to receive second hidden state data at time t and the output of CNN layer 1203B. The outputs of the CNN layers 1203A,B may comprise a number of features. The features may be normalized and averaged by the GRUs 1205A,B, and sent to MLP 1210 to generate a channel fingerprint at time t. The GRUs 1205A,B may also generate first and second hidden states, respectively, at time t+1.

Figure 13:
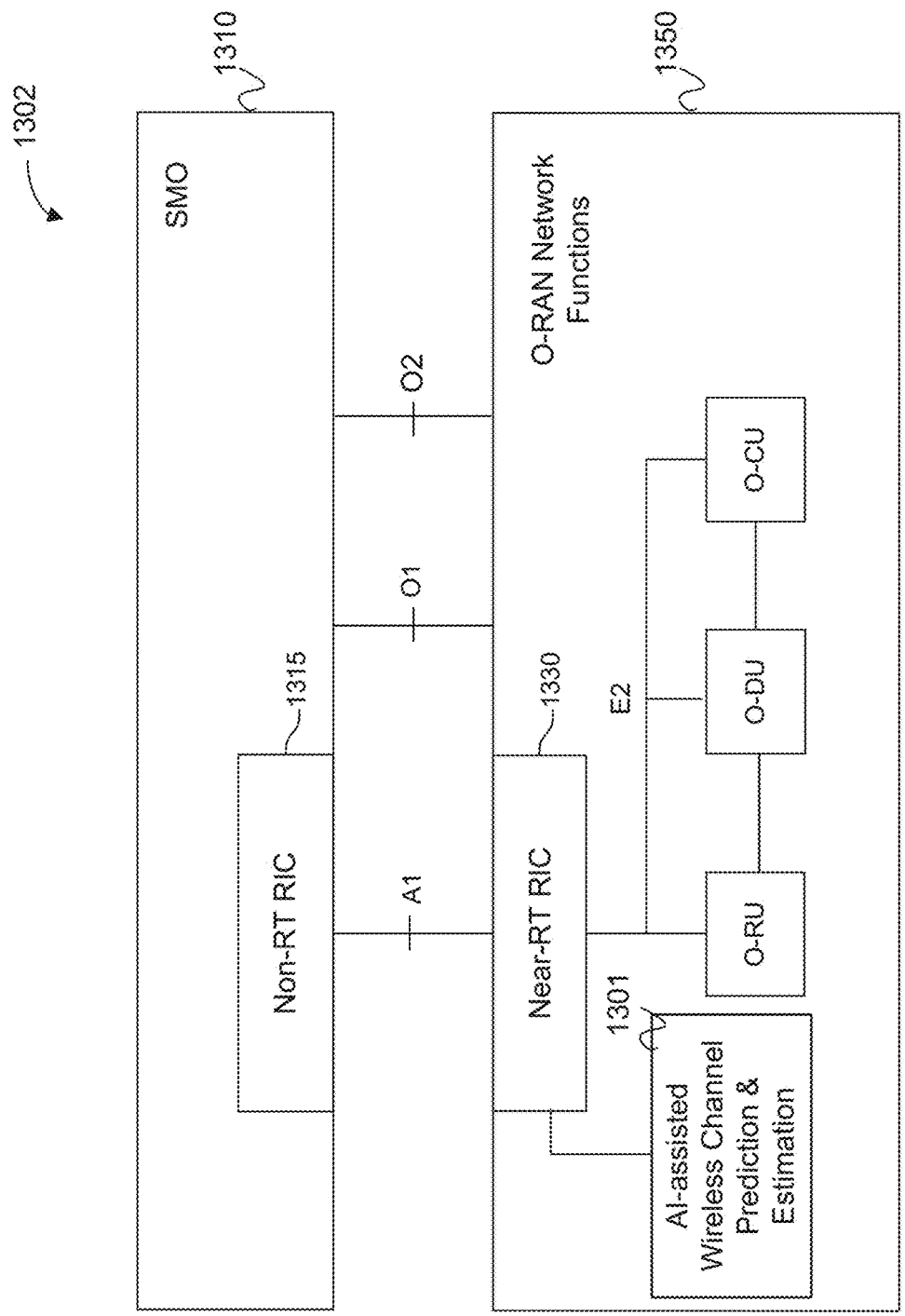
FIG. 13 is an illustration of an example of an Open Radio Access Network (ORAN) architecture, according to one embodiment.

FIG. 13 is an illustration of an example Open Radio Access Network (O-RAN) architecture 1302. The example O-RAN architecture 1302 may include a service management orchestration component 1310 (hereafter referred to as "SMO") that oversees all orchestration, management and automation of RAN elements. The SMO 1310 can support O1, A1 and O2 interfaces. The following disclosures of O-RAN network architectures and elements are incorporated herein by reference in their entirety: O-RAN.WG1 Use Cases and Overall Architecture Workgroup; O-RAN.WG2 Non-Real Time RAN Intelligent Controller and A1 Interface Workgroup; O-RAN.WG3 Near-Real Time RIC and E2 Interface Workgroup; O-RAN.WG5 Open F1 W1 E1 X2 Xn Interface Workgroup, O-RAN.WG6 Cloudification and Orchestration Workgroup, O-RAN.WG7 White-box Hardware Workgroup, O-RAN.WG8 Stack Reference Design Workgroup, O-RAN.WG9 Open X-Haul Transport Workgroup, O-RAN.WG10 OAM for O-RAN, O-RAN.WG11 Security Work Group. In addition, the technical specification disclosed in the 2022 O-RAN Test and Integration Focus Group Certification and Badging Processes and Procedures is incorporated herein by reference in their entirety. The SMO 1310 includes a Non-Real Time RAN Intelligent Controller 1315 (hereafter referred to as a "Non-RT RIC"). The Non-RT RIC 1315 is centrally deployed in the service provider network, which enables Non-Real Time control of RAN elements and their resources through specialized applications called rAPPs.

The O-RAN architecture 1302 further includes O-RAN Network Functions 1350 comprising a Near-Real-Time RAN Intelligent controller 1330 (hereafter referred to as a "Near-RT RIC"), an O-RAN Central Unit (hereafter referred to as "O-CU"), O-RAN Distributed Unit (hereafter referred to as "O-DU"), and an O-RAN Radio Unit (hereafter referred to as "O-RU"). The Near-RT RIC 1330 resides within a telco edge cloud or regional cloud and is responsible for intelligent edge control of RAN nodes and resources. The Near-RT RIC 1330 controls RAN elements and their resources with optimization actions that typically have latency requirements in the range of 10 milliseconds or less. The Near-RT RIC 1330 receives policy guidance from the Non-RT RIC 1315 and provides policy feedback to the Non-RT RIC 1315 through specialized applications called xAPPs. The Non-RT RIC 1315 and Near-RT RIC 1330 offer frameworks to specific applications (e.g., rAPPs for Non-RT RIC and xAPPs for Near-RT RIC) that may be integrated into RICs with minimum effort, enabling different contributors to provide particular applications for problems within their domain of expertise that was not possible in legacy closed systems. The Near-RT RIC may include an AI-Assisted Wireless Channel Prediction & Estimation system 1301 configured to accurately predict complex-valued channel estimate when no reference or training signal is present.

The O-CU is a logical node configured to host RRC, SDAP and PDCP protocols. The O-CU includes two subcomponents: an O-RAN Central Unit-Control Plane (hereafter referred to a "O-RAN CU-CP") and an O-RAN Central Unit-User Plane ("O-RAN CU-UP"). The O-RU is a logical node hosting a Low-PHY layer and RF processing based on a lower layer functional split. The O-DU is a logical node hosting RLC/MAC/High-PHY layers based on a lower layer functional split.

Figure 14:
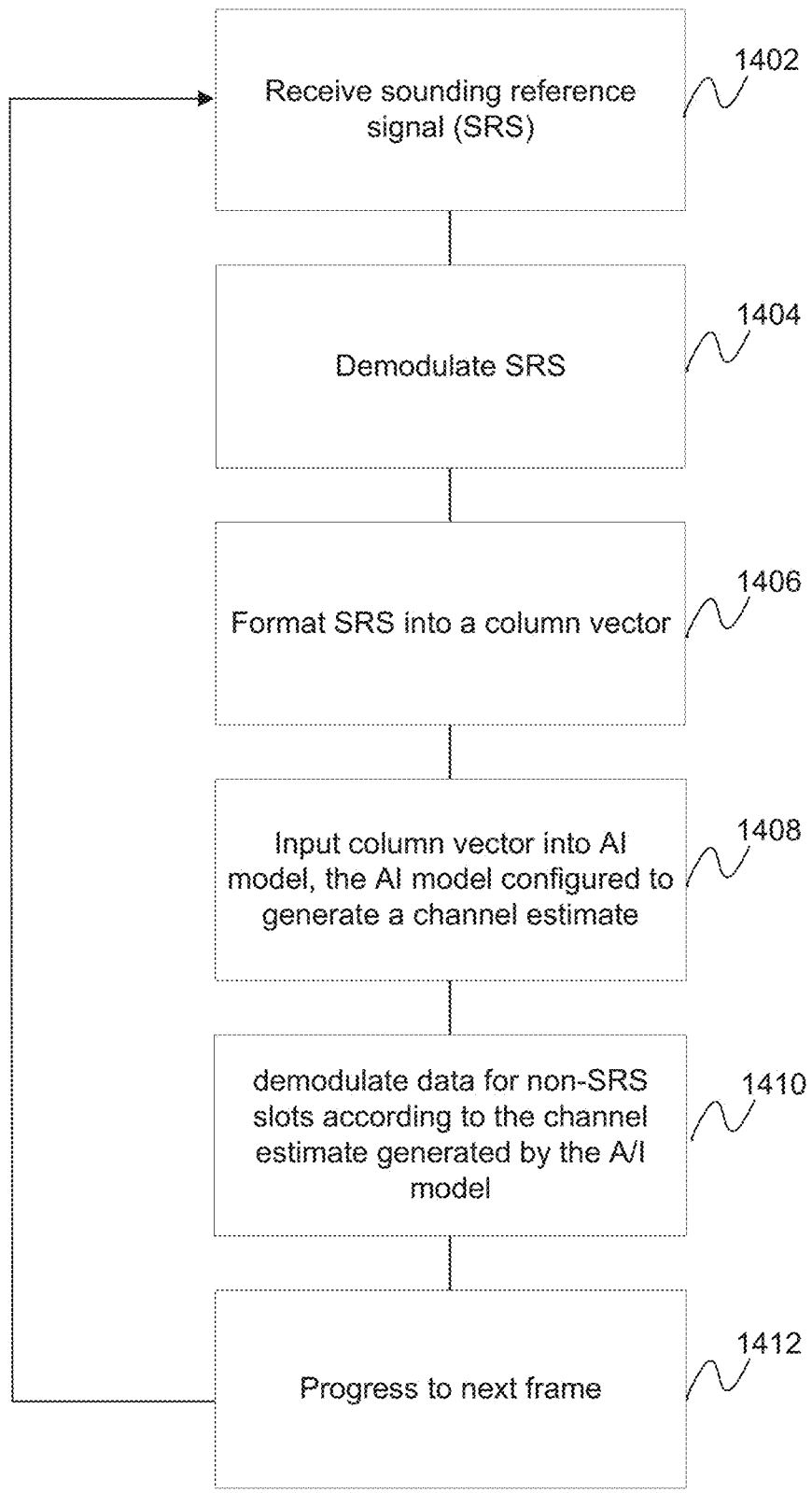
FIG. 14 is an illustration of an example method of generating a channel estimate, according to one embodiment.

FIG. 14 is an illustration of using TDIR to accurately predict the complex-valued channel estimate in slots where no reference signal is present, according to an embodiment.

Operation 1402 includes receiving a SRS. Operation 1404 includes demodulating the SRS to estimate the complex valued channel response (e.g., amplitude gain and phase shift). The SRS may be decoded to generate a low-resolution column vector comprising sub-sampled slots (e.g., non-SRS slots), at operation 1406.

Operation 1406 includes formatting the SRS into a column vector. The column vector may be a low-resolution column vector comprising a plurality of frames sequentially stacked in the y-direction along the plurality of RBs. Each frame may include n number of slots. For example, in one embodiment, the frame may include ten slots (e.g., slots 0-9) representing 10 milliseconds of time, or one slot for each millisecond. Once formatted, the column vector is fed into the AI model to generate a channel prediction according to operation 1408.

Operation 1408 includes inputting the column vector into the AI model. The AI model is configured to receive the inputted column vector and output a channel prediction. The predicted channel estimate can used by the system to demodulate data for non-SRS slots according to operation 1410. For example, upon receiving an input column vector based on the channel estimates from the SRS at slot n, the AI model can generate a predicted channel estimate for non-SRS slots. The AI model may be trained by using a plurality of low-resolution channel estimates TDIRs based on SRS signals to generate high-resolution channel prediction TDIRs to learn image recognition patterns to accurately generate a high-resolution TDIR upon receiving a low-resolution input TDIR. For example, the AI model can be trained using a low-resolution input channel estimate TDIR based on the SRS comprising 100 slots, each slot representing 1 millisecond in time, over 300 RBs. The low-resolution input channel estimate TDIR is used by the AI model to a high resolution channel prediction TDIR. By generating a high-resolution output channel prediction TDIR and comparing the high-resolution output channel prediction TDIR to the high-resolution TDIR as a ground truth, the AI model learns patterns between the low-resolution input TDIR and the high-resolution ground truth TDIR. These learned patterns may be stored in memory and used to generate channel estimations for the sub-sampled (e.g., non-SRS) slots.

For example, in an embodiment, the low-resolution input TDIR includes 100 slots and 300 RBs. The low-resolution input channel estimate TDIR based on the SRS may be used to train the AI model to generate a high-resolution output channel prediction TDIR. If the high-resolution output channel prediction TDIR is within a set threshold of the ground truth TDIR, the AI model can be considered trained. The trained AI model can be used to generate a channel estimation for non-SRS slots within slots 101-109 upon receiving column vectors for slots 100-109.

By using a plurality of TDIR inputs (e.g., first, second and third low resolution input TDIRs) to train the AI model, the AI model can use image pattern recognition to accurately generate channel estimations for non-SRS slots for new column vectors inputted into the AI model. Accordingly, the AI model can accurately estimate and predict the channel for the sub-sampled channel, removing the need for a more frequent periodicity of SRS signals.

Operation 1410 includes demodulating data for non-SRS slots according to the channel estimate generated by the AI model. In an embodiment, once the channel estimate is obtained, the receiver may use the channel estimate to demodulate data in the non-SRS slots. Upon demodulating the non-SRS slots, the system progresses to the next frame at operation 1412.

Figure 15:
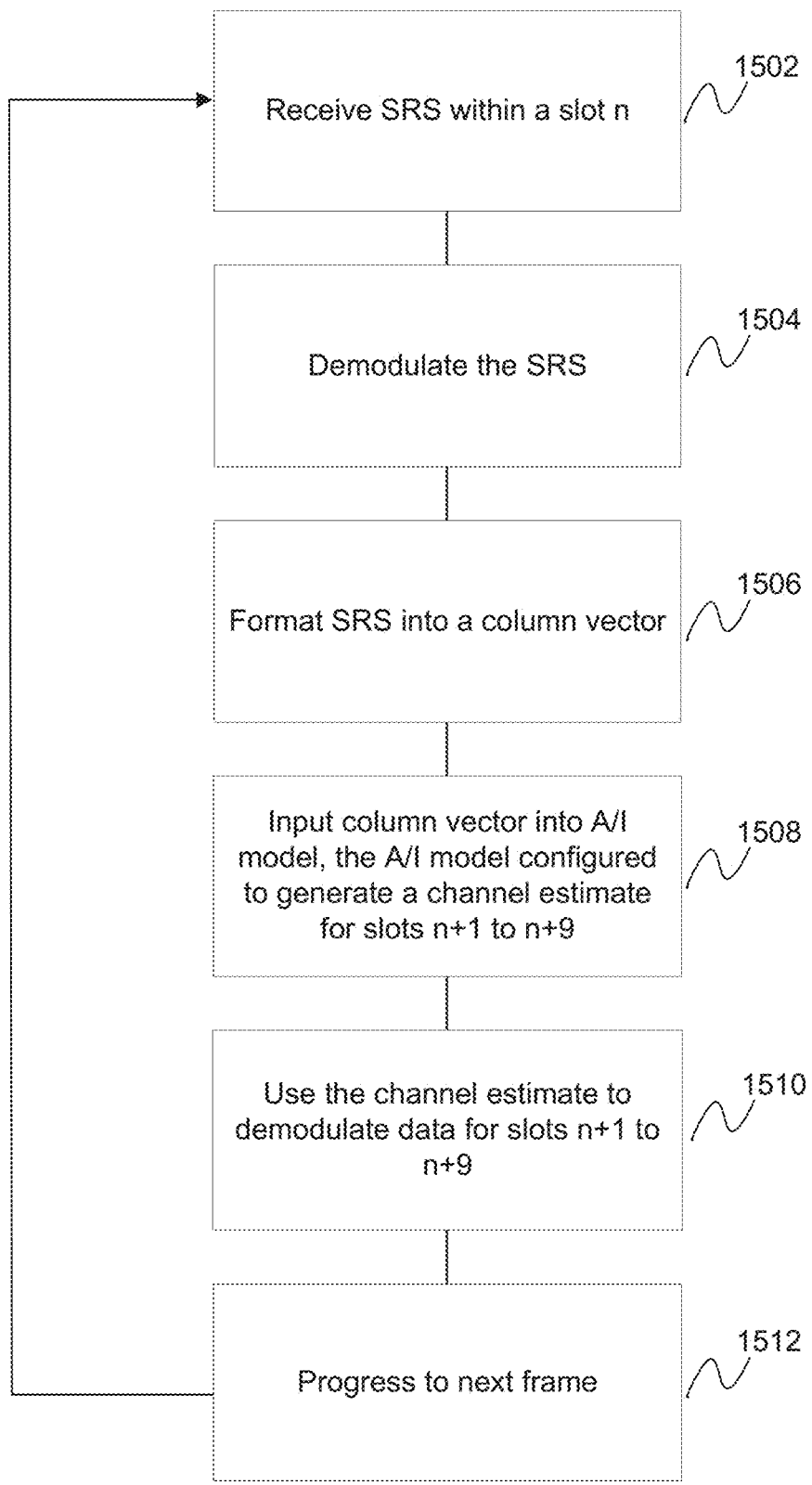
FIG. 15 is an illustration of an example method of predicting a channel estimate for slots n+1 to n+9, according to one embodiment.

FIG. 15 is an illustration of using the TDIR to accurately predict the complex-valued channel estimate where no reference signal is present, according to one embodiment. In this embodiment, channel estimates are based on a reference signal conducted every ten slots (e.g., SDDDDDDDDD).

Operation 1502 includes receiving the SRS for slot n. Upon receiving the SRS, operation 1504 demodulates the SRS, for example according to operation 1404. Operation 1506 includes formatting the SRS into a column vector, for example according to operation 1406.

Operation 1508 includes using the column vector as an input into the AI model, for example according to operation 1408. Upon receiving an input column vector based on the channel estimate from the SRS at slot n, the AI model is configured to generate a predicted channel estimate for slots n+1 to n+9. The predicted channel estimate may be used to demodulate the data for slots n+1 to n+9, and progress to the next frame according to operations 1510 and 1512.

Figure 16:
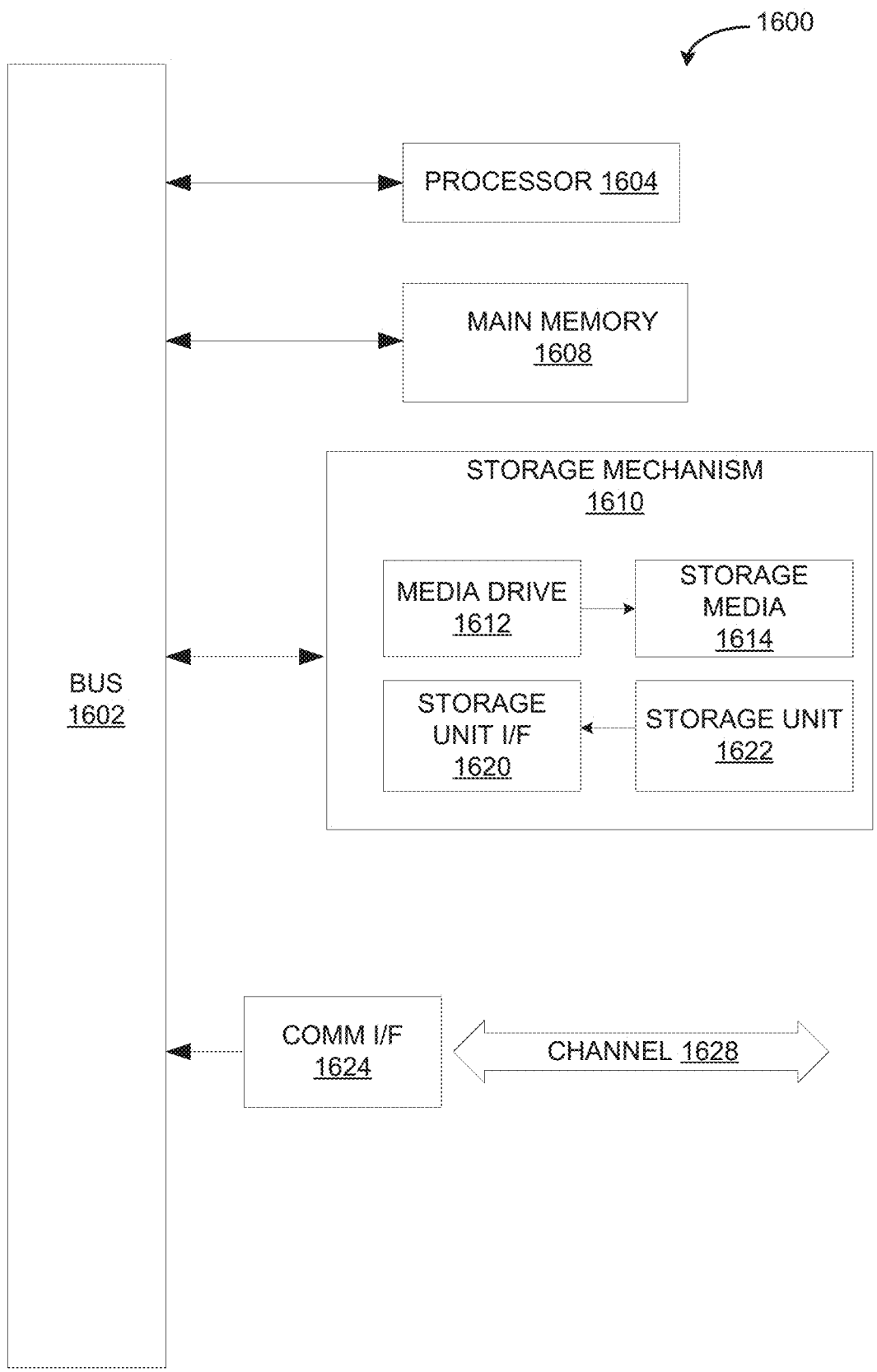
FIG. 16 illustrates an example computing system that may be used in implementing various features of embodiments of the disclosed technology.

FIG. 16 illustrates an example computing module 1600, an example of which may be a processor/controller resident on a mobile device or network device, that may be used to implement various features and/or functionality of the systems and methods disclosed in the present disclosure.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAS, PALS, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 16. Various embodiments are described in terms of this example-computing module 1600. After reading this description, it will become apparent to a person skilled in the relevant art how to implement the application using other computing modules or architectures.

Referring now to FIG. 16, computing module 1600 may represent, for example, computing or processing capabilities found within desktop, laptop, notebook, tablet, cloud and edge, computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 1600 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1600 might include, for example, one or more processors, controllers, control modules, or other processing devices, such as a processor 1604. Processor 1604 might be implemented using a general-purpose or special-purpose processing engine such as, for example, a microprocessor, controller, or other control logic. In the illustrated example, processor 1604 is connected to a bus 1602, although any communication medium can be used to facilitate interaction with other components of computing module 1600 or to communicate externally. The bus 1602 may also be connected to other components such as a display, input devices, or cursor control to help facilitate interaction and communications between the processor and/or other components of the computing module 1600.

Computing module 1600 might also include one or more memory modules, simply referred to herein as main memory 1608. For example, preferably random-access memory (RAM) or other dynamic memory might be used for storing information and instructions to be executed by processor 1604. Main memory 1608 might also be used for storing temporary variables or other intermediate information during execution of instructions to be executed by processor 1604. Computing module 1600 might likewise include a read only memory ("ROM") or other static storage device 1610 coupled to bus 1602 for storing static information and instructions for processor 1604.

Computing module 1600 might also include one or more various forms of information storage devices 1610, which might include, for example, a media drive 1612 and a storage unit interface 1620. The media drive 1612 might include a drive or other mechanism to support fixed or removable storage media 1614. For example, a hard disk drive, a floppy disk drive, a magnetic tape drive, an optical disk drive, a CD, DVD or Bluray drive (R or RW), or other removable or fixed media drive 1612 might be provided. Accordingly, storage media 1614 might include, for example, a hard disk, a floppy disk, magnetic tape, cartridge, optical disk, a CD or DVD, or other fixed or removable medium that is read by, written to or accessed by media drive 1612. As these examples illustrate, the storage media 1614 can include a computer usable storage medium having stored therein computer software or data.

In alternative embodiments, information storage devices 1610 might include other similar instrumentalities for allowing computer programs or other instructions or data to be loaded into computing module 1600. Such instrumentalities might include, for example, a fixed or removable storage unit 1622 and a storage unit interface 1620. Examples of such storage units and storage unit interfaces can include a program cartridge and cartridge interface, a removable memory (for example, a flash memory or other removable memory module) and memory slot, a PCMCIA slot and card, and other fixed or removable storage units and interfaces that allow software and data to be transferred from the storage unit to computing module 1600.

Computing module 1600 might also include a communications interface 1624 or network interface(s). Communications or network interface(s) interface 1624 might be used to allow software and data to be transferred between computing module 1600 and external devices. Examples of communications interface or network interface(s) might include a modem or soft modem, a network interface (such as an Ethernet, network interface card, WiMedia, WiFi, IEEE 802.XX or other interface), a communications port (such as for example, a USB port, IR port, RS232 port Bluetooth® interface, or other port), or other communications interface. Software and data transferred via communications or network interface(s) might typically be carried on signals, which can be electronic, electromagnetic (which includes optical) or other signals capable of being exchanged by a given communications interface. These signals might be provided to communications interface via a channel 1628. This channel might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 1608, ROM, and storage unit interface 1620. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1600 to perform features or functions of the present application as discussed herein.

Various embodiments have been described with reference to specific exemplary features thereof. It will, however, be evident that various modifications and changes may be made thereto without departing from the broader spirit and scope of the various embodiments as set forth in the appended claims. The specification and FIGS. are, accordingly, to be regarded in an illustrative rather than a restrictive sense.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system, comprising:
one or more hardware processors; and
one or more non-transitory machine-readable storage media encoded with instructions that, when executed by the one or more hardware processors, cause the system to perform operations comprising:
receiving an uplink signal from a user equipment (UE), the uplink signal comprising an sounding reference signal (SRS) slot followed by multiple non-SRS slots;
obtaining an SRS by demodulating the SRS slot;
formatting the SRS into a column vector; and
generating a predicted channel estimate for the non-SRS slots by applying the column vector as input to a trained artificial intelligence (AI) model, wherein responsive to the input, the trained AI model outputs the predicted channel estimate, wherein the trained AI model has been trained with a training data set, and wherein the training data set includes historical low-resolution two dimensional image representations (TDIR) of channel estimates over time and frequency.

2. The system of claim 1, the operations further comprising:
demodulating the non-SRS slots according to the predicted channel estimate.

3. The system of claim 1, wherein generating the predicted channel estimate for the non-SRS slots further comprises:
applying a hidden state to the trained AI model, the hidden state generated by the trained AI model based on a prior SRS.

4. The system of claim 3, wherein generating the predicted channel estimate for the non-SRS slots further comprises:
receiving a fingerprint of a channel of the uplink signal, the fingerprint generated prior to the SRS slot; and
generating the predicted channel estimate for the non-SRS slots based on the fingerprint.

5. The system of claim 4, the operations further comprising:
generating the fingerprint by:
reducing a dimensionality of the prior SRS by applying the prior SRS as input to one or more convolutional neural networks (CNNs),
applying the hidden state and an output of the one or more CNNs as input to a recurrent artificial intelligence (AI) model, and
applying an output of the recurrent AI model to a multilayer perception (MLP) layer, wherein responsive to the output of the recurrent AI model, the MLP layer generates the fingerprint.

6. The system of claim 1, the operations further comprising:
validating the trained AI model by applying a testing data set as input to the trained AI model, wherein the testing data set is different from the training data set, and determining an error rate by comparing a resulting output of the trained AI model with known genie values.

7. The system of claim 6, the operations further comprising:
retraining the AI model using additional training data sets responsive to the error rate exceeding a threshold value.

8. One or more non-transitory machine-readable storage media encoded with instructions that, when executed by one or more hardware processors of a computing system, cause the computing system to perform operations comprising:
receiving an uplink signal from a user equipment (UE), the uplink signal comprising an sounding reference signal (SRS) slot followed by multiple non-SRS slots;
obtaining an SRS by demodulating the SRS slot;
formatting the SRS into a column vector; and
generating a predicted channel estimate for the non-SRS slots by applying the column vector as input to a trained artificial intelligence (AI) model, wherein responsive to the input, the trained AI model outputs the predicted channel estimate, wherein the trained AI model has been trained with a training data set, and wherein the training data set includes historical low-resolution two dimensional image representations (TDIR) of channel estimates over time and frequency.

9. The one or more non-transitory machine-readable storage media of claim 8, the operations further comprising:
demodulating the non-SRS slots according to the predicted channel estimate.

10. The one or more non-transitory machine-readable storage media of claim 8, wherein generating the predicted channel estimate for the non-SRS slots further comprises:
applying a hidden state to the trained AI model, the hidden state generated by the trained AI model based on a prior SRS.

11. The one or more non-transitory machine-readable storage media of claim 10, wherein generating the predicted channel estimate for the non-SRS slots further comprises:

receiving a fingerprint of a channel of the uplink signal, the fingerprint generated prior to the SRS slot; and generating the predicted channel estimate for the non-SRS slots based on the fingerprint.

12. The one or more non-transitory machine-readable storage media of claim 11, the operations further comprising:

generating the fingerprint by:

reducing a dimensionality of the prior SRS by applying the prior SRS as input to one or more convolutional neural networks (CNNs), applying the hidden state and an output of the one or more CNNs as input to a recurrent artificial intelligence (AI) model, and applying an output of the recurrent AI model to a multi-layer perception (MLP) layer, wherein responsive to the output of the recurrent AI model, the MLP layer generates the fingerprint.

13. The one or more non-transitory machine-readable storage media of claim 8, the operations further comprising:

validating the trained AI model by applying a testing data set as input to the trained AI model, wherein the testing data set is different from the training data set, and determining an error rate by comparing a resulting output of the trained AI model with known genie values.

14. The one or more non-transitory machine-readable storage media of claim 13, the operations further comprising:

retraining the AI model using additional training data sets responsive to the error rate exceeding a threshold value.

15. A computer-implemented method comprising:

receiving an uplink signal from a user equipment (UE), the uplink signal comprising an sounding reference signal (SRS) slot followed by multiple non-SRS slots;

obtaining an SRS by demodulating the SRS slot;

formatting the SRS into a column vector; and generating a predicted channel estimate for the non-SRS slots by applying the column vector as input to a trained artificial intelligence (AI) model, wherein responsive to the input, the trained AI model outputs the predicted channel estimate, wherein the trained AI model has been trained with a training data set, and wherein the training data set includes historical low-resolution two dimensional image representations (TDIR) of channel estimates over time and frequency.

16. The computer-implemented method of claim 15, further comprising:

demodulating the non-SRS slots according to the predicted channel estimate.

17. The computer-implemented method of claim 15, wherein generating the predicted channel estimate for the non-SRS slots further comprises:

applying a hidden state to the trained AI model, the hidden state generated by the trained AI model based on a prior SRS.

18. The computer-implemented method of claim 17, wherein generating the predicted channel estimate for the non-SRS slots further comprises:

receiving a fingerprint of a channel of the uplink signal, the fingerprint generated prior to the SRS slot; and generating the predicted channel estimate for the non-SRS slots based on the fingerprint.

19. The computer-implemented method of claim 18, further comprising:

generating the fingerprint by:

reducing a dimensionality of the prior SRS by applying the prior SRS as input to one or more convolutional neural networks (CNNs), applying the hidden state and an output of the one or more CNNs as input to a recurrent artificial intelligence (AI) model, and applying an output of the recurrent AI model to a multi-layer perception (MLP) layer, wherein responsive to the output of the recurrent AI model, the MLP layer generates the fingerprint.

20. The computer-implemented method of claim 15, further comprising:

validating the trained AI model by applying a testing data set as input to the trained AI model, wherein the testing data set is different from the training data set, and determining an error rate by comparing a resulting output of the trained AI model with known genie values; and retraining the AI model using additional training data sets responsive to the error rate exceeding a threshold value.

* * * * *